United States Patent
Iwase et al.

(10) Patent No.: US 11,270,074 B2
(45) Date of Patent: Mar. 8, 2022

(54) INFORMATION PROCESSING APPARATUS, INFORMATION PROCESSING SYSTEM, AND INFORMATION PROCESSING METHOD, AND PROGRAM

(71) Applicant: SONY CORPORATION, Tokyo (JP)

(72) Inventors: Hiro Iwase, Kanagawa (JP); Shinichi Kawano, Tokyo (JP); Yuhei Taki, Kanagawa (JP); Kunihito Sawai, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 182 days.

(21) Appl. No.: 16/485,620

(22) PCT Filed: Oct. 26, 2018

(86) PCT No.: PCT/JP2018/039826
§ 371 (c)(1),
(2) Date: Aug. 13, 2019

(87) PCT Pub. No.: WO2019/142427
PCT Pub. Date: Jul. 25, 2019

(65) Prior Publication Data
US 2019/0371296 A1    Dec. 5, 2019

(30) Foreign Application Priority Data

Jan. 16, 2018  (JP) .............................. JP2018-005061

(51) Int. Cl.
*G10L 15/06*      (2013.01)
*G06F 40/295*     (2020.01)
(Continued)

(52) U.S. Cl.
CPC .......... *G06F 40/295* (2020.01); *G06F 40/237* (2020.01); *G10L 15/063* (2013.01);
(Continued)

(58) Field of Classification Search
CPC ....... G10L 15/063; G10L 15/00; G10L 15/01; G10L 15/06; G10L 15/065; G10L 15/07;
(Continued)

(56) References Cited

U.S. PATENT DOCUMENTS 9,741,337 B1 *  8/2017  Shastry ................. G10L 15/187
10,579,682 B1 *  3/2020  Cowan ................... G06N 20/00
10,699,706 B1 *  6/2020  Jayavel .................. G10L 13/08

FOREIGN PATENT DOCUMENTS

JP      2017-516153 A      6/2017
WO   WO 2016/151699 A1    9/2016

* cited by examiner

*Primary Examiner* — Qi Han
(74) *Attorney, Agent, or Firm* — Paratus Law Group, PLLC

(57) ABSTRACT

Implemented are an apparatus and a method that enable highly accurate intent estimation of a user utterance. An utterance learning adaptive processing unit analyzes a plurality of user utterances input from a user, generates learning data in which entity information included in a user utterance with an unclear intent is associated with a correct intent, and stores the generated learning data is a storage unit. The utterance learning adaptive processing unit generates learning data in which an intent, acquired from a response utterance from the user to an apparatus utterance after input of a first user utterance with an unclear intent, is recorded in association with entity information included in the first user utterance. The learning data is recorded to include superordinate semantic concept information of the entity information. At the time of estimating an intent for a new user utterance, learning data with similar superordinate semantic concept information is used.

19 Claims, 20 Drawing Sheets

(51) Int. Cl.
*G10L 15/18* (2013.01)
*G10L 15/30* (2013.01)
*G06F 40/237* (2020.01)

(52) U.S. Cl.
CPC .......... *G10L 15/1815* (2013.01); *G10L 15/30* (2013.01); *G10L 2015/0636* (2013.01)

(58) Field of Classification Search
CPC ..... G10L 15/075; G10L 15/08; G10L 15/144; G10L 15/146; G10L 15/18; G10L 15/1815; G10L 15/1822; G10L 15/183; G10L 15/19; G10L 15/193; G10L 15/20; G10L 15/22; G10L 15/24; G10L 15/26; G10L 2015/063; G10L 2015/00; G10L 2015/06; G10L 2015/0631; G10L 2015/0633; G10L 2015/0635; G10L 2015/0636; G10L 2015/0638; G10L 2015/08; G10L 2015/22; G10L 2015/223; G10L 2015/225; G10L 2015/226; G10L 2015/228; G10L 2015/085; G10L 2015/221–228
USPC ....... 704/243, 236, 244, 245, 235, 251, 254, 704/255, 256.2, 257, 270, 270.1
See application file for complete search history.

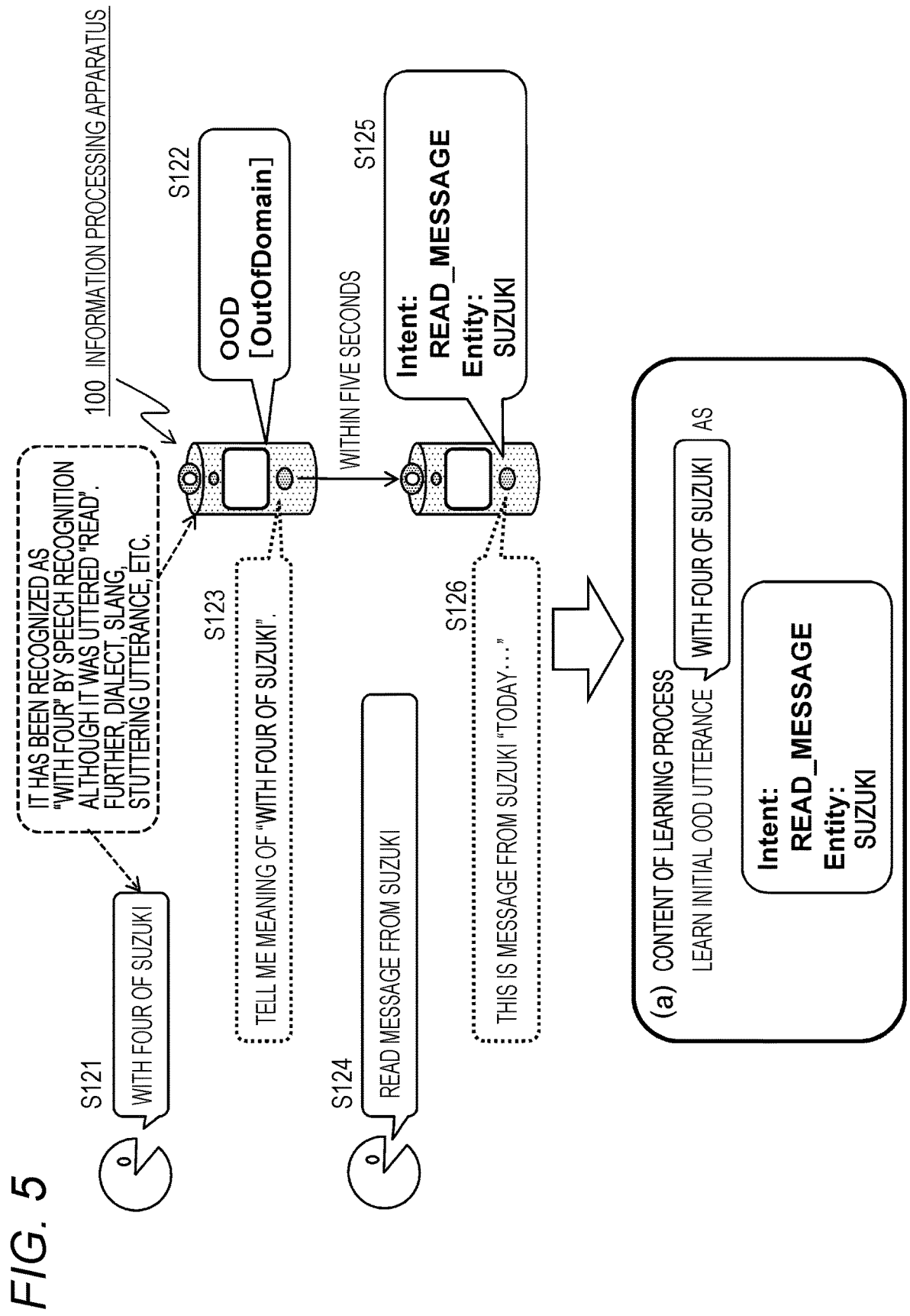

FIG. 6

(a) LEARNING DATA EXAMPLE

```
"speech": "DO KUWAHARA KEISUKE",
"intent": {
    "value": "PLAY_MUSIC",
    "score": 0.0
},
"entities": [ · · · ],
"date": "2017-11-01T15:09:17.7540877+09:00",
"speechCount": 1.0
```

(b) CONFIGURATION EXAMPLE OF ENTITY INFORMATION

```
"literal": "KUWAHARA KEISUKE",
"type": "TARGET_MUSIC",
"nlpInfo": {
    "type": "NOUN PHRASE",
    "cas": "CONTINUOUS MODIFICATION CLAUSE",
    "df": [
        "TARGET",
        "REQUEST",
        "DESIRE"
    ],
    "pos": "NOUN: COMMON NOUN: PROPER NOUN: NAME: PERSONAGE",
    "sfeatures": [
        "CONTENTS: MUSIC: PERSONAGE"
    ]
```

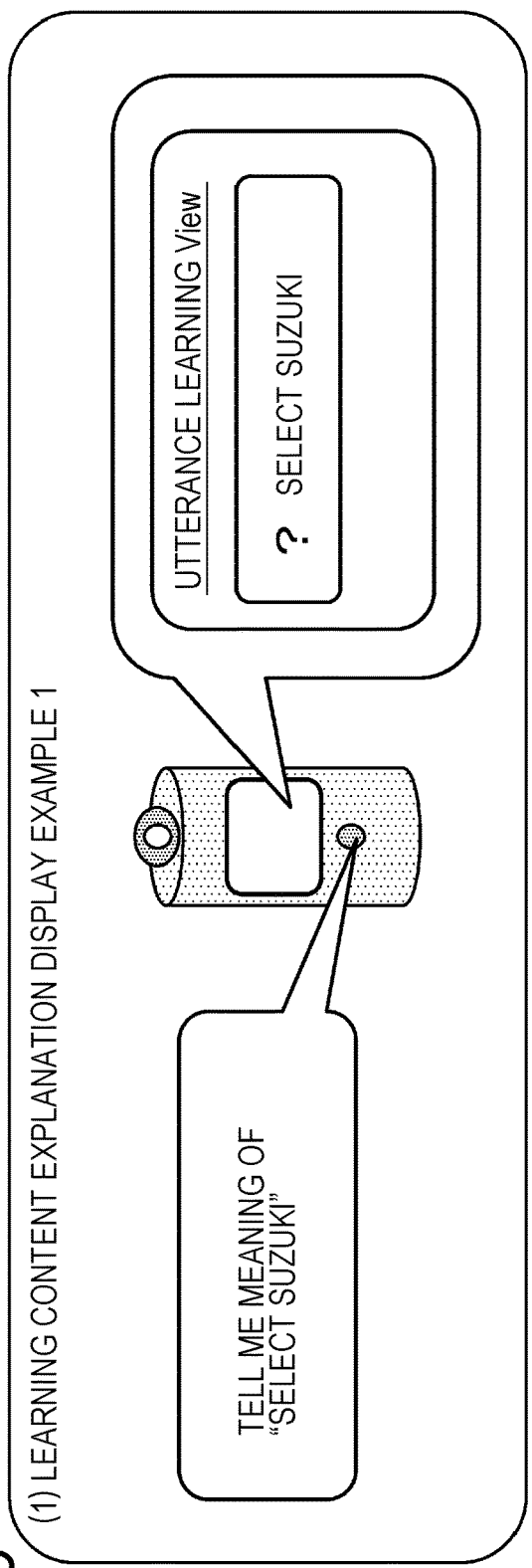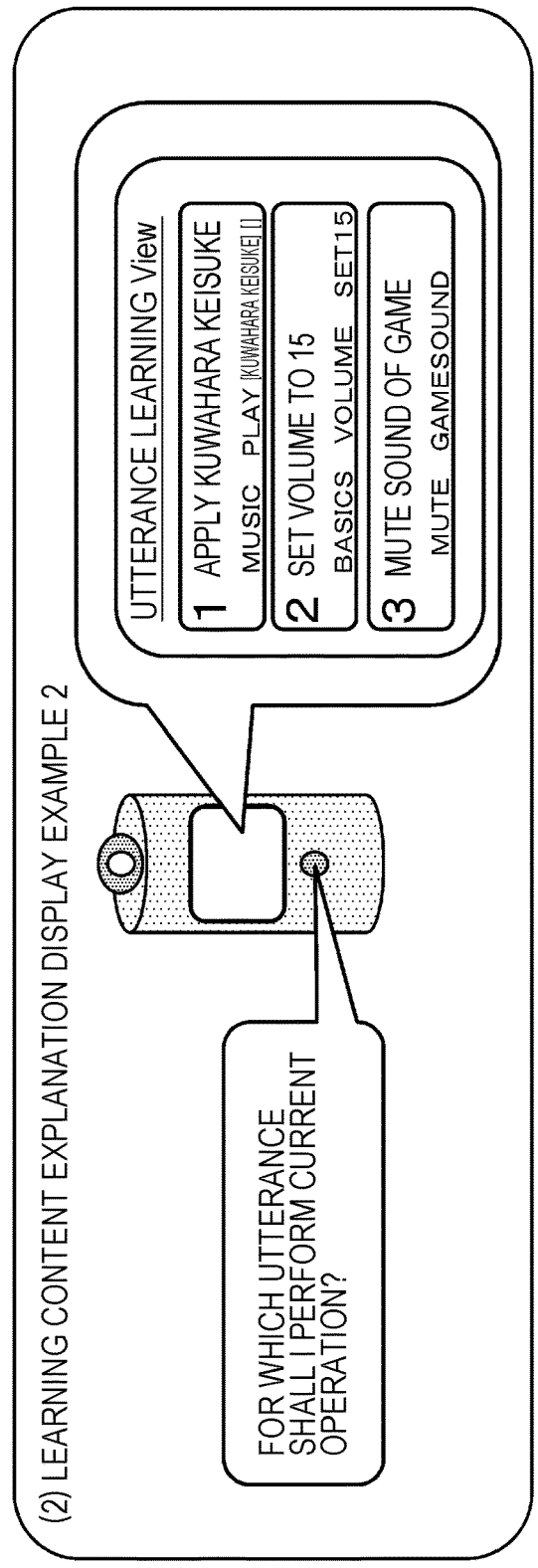
FIG. 16

INFORMATION PROCESSING APPARATUS, INFORMATION PROCESSING SYSTEM, AND INFORMATION PROCESSING METHOD, AND PROGRAM

CROSS REFERENCE TO PRIOR APPLICATION

This application is a National Stage Patent Application of PCT International Patent Application No. PCT/JP2018/039826 (filed on Oct. 26, 2018) under 35 U.S.C. § 371, which claims priority to Japanese Patent Application No. 2018-005061 (filed on Jan. 16, 2018), which are all hereby incorporated by reference in their entirety.

TECHNICAL FIELD

The present disclosure relates to an information processing apparatus, an information processing system, and an information processing method, and a program. More specifically, the present invention relates to an information processing apparatus, an information processing system, and an information processing method, and a program that perform a speech recognition process of a user utterance.

BACKGROUND ART

Recently, there is an increasing use of a speech dialogue system that performs speech recognition of a user utterance and performs various processes and responses based on recognition results.

In such a speech recognition system, the user utterance input via a microphone is recognized and understood, and processing is performed in accordance with the recognized and understood result.

For example, in a case where the user utters "tell me the weather of tomorrow", processing is performed to acquire weather information from a weather information providing server, generate a response based on the acquired information, and output the generated response from a speaker. Alternatively, in a case where the user utters "turn off the television", an operation is performed to turn off the television.

A typical speech dialogue system has, for example, a natural language understanding functions such as natural language understanding (NLU), and applies the natural language understanding (NLU) function to understand an intent of a user utterance.

However, there is a case where it is difficult to correctly understand the user utterance intent even if the natural language understanding (NLU) process is applied due to individual differences in wording or the like.

Uttering users include users speaking various dialects in various ages, and further include non-native people who do not use a supported language of the system as the native language.

Utterances of such various types of users have characteristics and are difficult for the system to understand in some cases.

In recent speech recognition systems, a process of learning various types of utterance data and enhancing accuracy in understanding of intents of various utterances using learning data is performed in order to cope with the diversity of utterances.

However, it is difficult to accurately understand the intents of all the diverse user utterances even if such a learning process is used.

Users often stop talking to the system in a case where the system does not understand their utterance intents.

General processing of the speech dialogue system is performed as follows.

A user utterance speech input from a speech input unit (microphone) is input to a speech recognition unit having an automatic speech recognition (ASR) function so as to convert speech data into text data.

The text data generated by the speech recognition unit is input to an intent understanding unit, and the intent understanding unit executes a natural language understanding (NLU) process to analyze an utterance intent from the text data.

The general speech dialogue system executes such processing.

For example, in a case where a user utterance has not been correctly converted to text (has been erroneously recognized) in the speech recognition (ASR) process included in the above-described processing, it is difficult to correctly execute the natural language understanding (NLU) process in the intent understanding unit at a later stage, and a result such as erroneous intent understanding and intent understanding incapability is output.

For example, there are individual differences in user's personal articulation, and there is also a limit in performance of automatic speech recognition (ASR). Therefore, it is difficult to completely prevent an error (erroneous recognition) in the automatic speech recognition (ASR) process and the natural language understanding (NLU) process.

Note that examples of the related art disclosing a configuration to enhance the intent understanding accuracy of the speech recognition system include Patent Document 1 (International Publication WO 2016/151699) and Patent Document 2 (Japanese Patent. Application National Publication (Laid-Open) No. 2017-516153).

Patent Document 1 discloses a configuration in which vector representation data based on constituent elements of text data obtained from an utterance is generated, and determination on a similarity with the vector representation data is performed based on various types of text data to improve accuracy in understanding of an intent of a user utterance.

Patent Document 2 discloses a configuration in which a speech recognition system executes a plurality of utterances with respect to a user, and accuracy in grasping an intent of a user utterance is enhanced on the basis of a semantic connection between a first utterance and a second utterance.

CITATION LIST

Patent Document

Patent Document 1: International Publication WO 2016/151699
Patent Document 2: Japanese Patent Application National Publication (Laid-Open) No. 2017-516153.

SUMMARY OF THE INVENTION

Problems to be Solved by the Invention

As described above, a plurality of technologies is disclosed as configurations to improve accuracy in understanding of an intent of a user utterance.

However, these configurations of the related arts are insufficient to realize correct intent understanding for unique wording peculiar to a user. Furthermore, it is difficult for a user to execute processing such as asking the speech recognition system to correct an interpretation so as to perform correct intent understanding of the user utterance.

The present disclosure has been made, for example, in view of the above problems, and an object thereof is to provide an information processing apparatus, an information processing system, and an information processing method, and a program which realize a configuration that more reliably performs understanding of an intent of a user utterance.

Solutions to Problems

A first aspect of the present disclosure is an information processing apparatus including an utterance learning adaptive processing unit that analyzes an intent (intent) of a user utterance, the utterance learning adaptive processing unit analyzing a plurality of user utterances input from a user, generating learning data in which entity information (entity) included in a user utterance with an unclear intent is associated with a correct intent, and storing the generated learning data in a storage unit.

Moreover, a second aspect of the present disclosure an information processing system including a user terminal and a data processing server. In the information processing system, the user terminal includes a speech input unit that inputs a user utterance, the data processing server includes an utterance learning adaptive processing unit that analyzes an intent (intent) of the user utterance received from the user terminal, and the utterance learning adaptive processing unit analyzes a plurality of user utterances input from a user, generates learning data in which entity information (entity) included in a user utterance with an unclear intent is associated with a correct intent, and stores the generated learning data in a storage unit.

Moreover, a third aspect of the present disclosure is an information processing method which is executed in an information processing apparatus. In the information processing method, a speech input unit inputs a user utterance, and an utterance learning adaptive processing unit executes an utterance learning adaptive process of analyzing an intent (intent) of the user utterance. In the utterance learning adaptive process, a process of analyzing a plurality of user utterances input from a user, and generating learning data in which entity information (entity) included in a user utterance with an unclear intent is associated with a correct intent, and storing the generated learning data in a storage unit is executed.

Moreover, a fourth aspect of the present disclosure is an information processing method which is executed in an information processing system including a user terminal and a data processing server. In the information processing method, the user terminal executes a speech input process of inputting a user utterance, and the data processing server executes an utterance learning adaptive process of analyzing an intent (intent) of the user utterance received from the user terminal. In the utterance learning adaptive process, a process of analyzing a plurality of user utterances input from a user, and generating learning data in which entity information (entity) included in a user utterance with an unclear intent is associated with a correct intent, and storing the generated learning data in a storage unit is executed.

Moreover, a fifth aspect of the present disclosure is a program which causes an information processing apparatus to execute information processing. The program includes: a speech input step of causing a speech input unit to input a user utterance; and causing an utterance learning adaptive processing unit to execute an utterance learning adaptive process of analyzing an intent (intent) of the user utterance. In the utterance learning adaptive process, a process of analyzing a plurality of user utterances input from a user, and generating learning data in which entity information (entity) included in a user utterance with an unclear intent is associated with a correct intent, and storing the generated learning data in a storage unit is executed.

Note that the program of the present disclosure is, for example, a program that can be provided as a storage medium or a communication medium provided in a computer-readable form to an information processing apparatus or a computer system that can execute various program codes. As such a program is provided in the computer-readable form, processing according to the program can be realized on the information processing apparatus or the computer system.

Still other objects, characteristics and advantages of the present disclosure will become apparent from a detailed description based on embodiments of the present disclosure as described later and accompanying drawings. Note that the term "system" in the present specification refers to a logical set configuration of a plurality of apparatuses, and is not limited to a system in which apparatuses of the respective configurations are provided in the same housing.

Effects of the Invention

According to a configuration of an embodiment of the present disclosure, an apparatus and a method, which enable highly accurate estimation of an intent of a user utterance, are realized.

Specifically, for example, an utterance learning adaptive processing unit analyzes a plurality of user utterances input from a user, generates learning data in which entity information included in a user utterance with an unclear intent is associated with a correct intent, and stores the generated learning data in a storage unit. The utterance learning adaptive processing unit generates learning data in which an intent, acquired from a response utterance from the user to an apparatus utterance after input of a first user utterance with an unclear intent, is recorded in association with entity information included in the first user utterance. The learning data is recorded to include superordinate semantic concept information of the entity information. At the time of estimating an intent for a new user utterance, learning data with similar superordinate semantic concept information is used.

With this configuration, the apparatus and the method, which enable the highly accurate estimation of an intent of a user utterance, are realized.

Note that the effects described in the present specification are merely examples and are not limited, and there may be additional effects.

BRIEF DESCRIPTION OF DRAWINGS

FIG. 5 is a diagram for describing a specific example of a "learning process A=learning dialogue flow of user utterance intent".

FIG. 6 is a diagram for describing a specific data configuration example of learning data.

FIG. 16 is a diagram for describing a display example to explicitly deliver what has been learned (is being learned) to a user during learning.

MODE FOR CARRYING OUT THE INVENTION

Hereinafter, details of an information processing apparatus, an information processing system, and an information processing method, and a program according to the present disclosure will be described with reference to the drawings. Note that a description will be made according to the following items.

1. Regarding Configuration. Example of information. Processing Apparatus

2. Regarding Details of Learning Dialogue Flow Executed by Utterance Learning Adaptive Processing Unit 3. Regarding processing for Polysemic Word as Identical Utterance Data Having Various Meanings 4. Regarding Countermeasures against Erroneous Learning Process 5. Regarding Automatic Oblivion Process of Learning Data 6. Regarding Details of Learning Dialogue Flow Executed by Utterance Learning Adaptive Processing Unit 7. Regarding Details of Process of Estimating Intent of User Utterance to Which Learning Data Has Been Applied.

8. Regarding Other Embodiments

9. Regarding State Transition and Effects of Processing of Information Processing Apparatus of Present Disclosure 10. Regarding Configuration Examples of Information Processing Apparatus and Information Processing System 11. Regarding Hardware Configuration Example of Information. Processing Apparatus 12. Summary of Configuration of Present Disclosure 1. Regarding Configuration Example of Information Processing Apparatus First, a configuration example of an information processing apparatus according to an embodiment of the present disclosure will be described with reference to FIG. 1 and the subsequent drawings.

Figure 1:
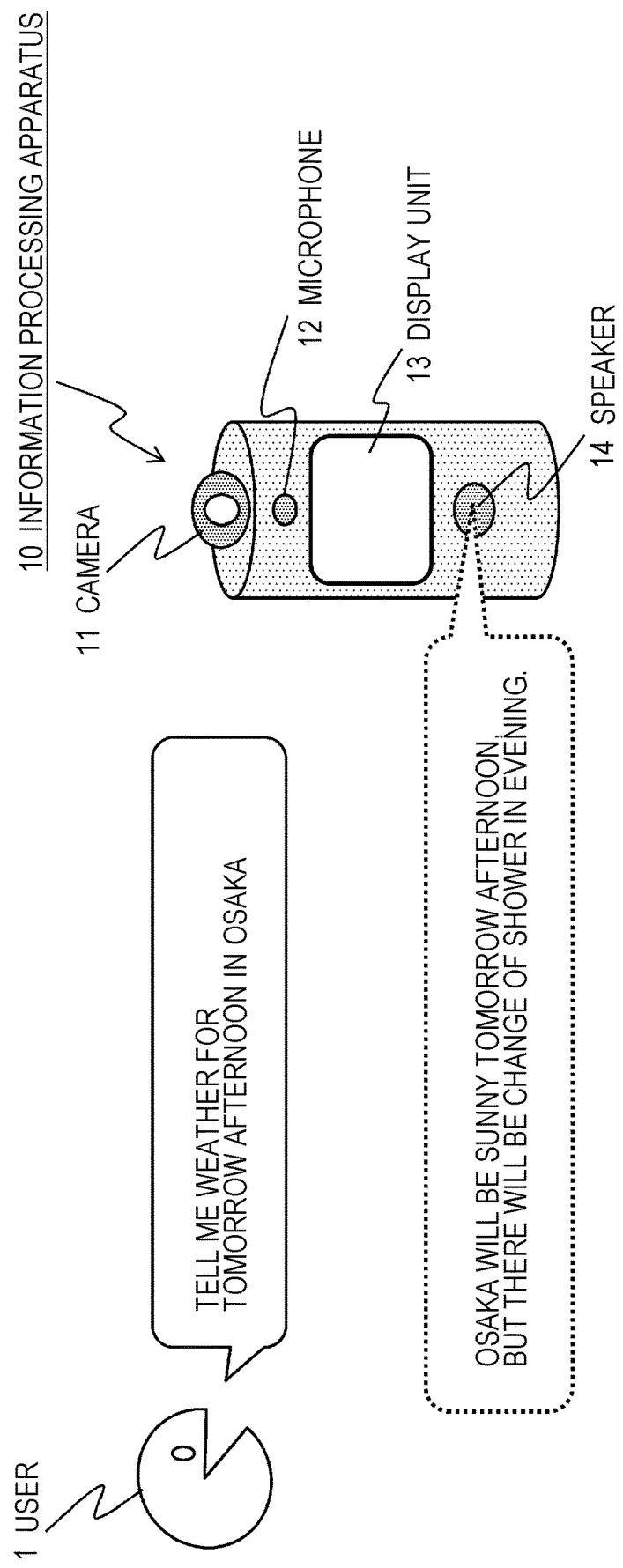
FIG. 1 is a diagram for describing a specific processing example of an information processing apparatus that recognizes a user utterance and performs a response.

FIG. 1 is a diagram illustrating a processing example of an information processing apparatus 10 that recognizes a user utterance spoken by a user 1 and performs a response.

For a user utterance, for example,

User utterance="Tell me the weather for tomorrow afternoon in Osaka", the information processing apparatus 10 executes a speech recognition process of this user utterance.

Moreover, the information processing apparatus 10 executes processing based on a speech recognition result of the user utterance.

In the example illustrated in FIG. 1, data to response to the user utterance="tell me the weather in Osaka tomorrow afternoon" is acquired, a response is generated on the basis of the acquired data, and the generated response is output via a speaker 14.

In the example illustrated in FIG. 1, the information processing apparatus 10 performs the following apparatus response.

Apparatus response="Osaka will be sunny tomorrow afternoon, but there will be a change of a shower in the evening".

The information processing apparatus 10 generates and outputs a response using knowledge data acquired from a storage unit in the apparatus or knowledge data acquired via a network.

The information processing apparatus 10 illustrated in FIG. 1 includes a camera 11, a microphone 12, a display unit 13, and a speaker 14, and has a configuration capable of speech input/output and image input/output.

The information processing apparatus 10 illustrated in FIG. 1 is called, for example, a smart, speaker or an agent device.

Figure 2:
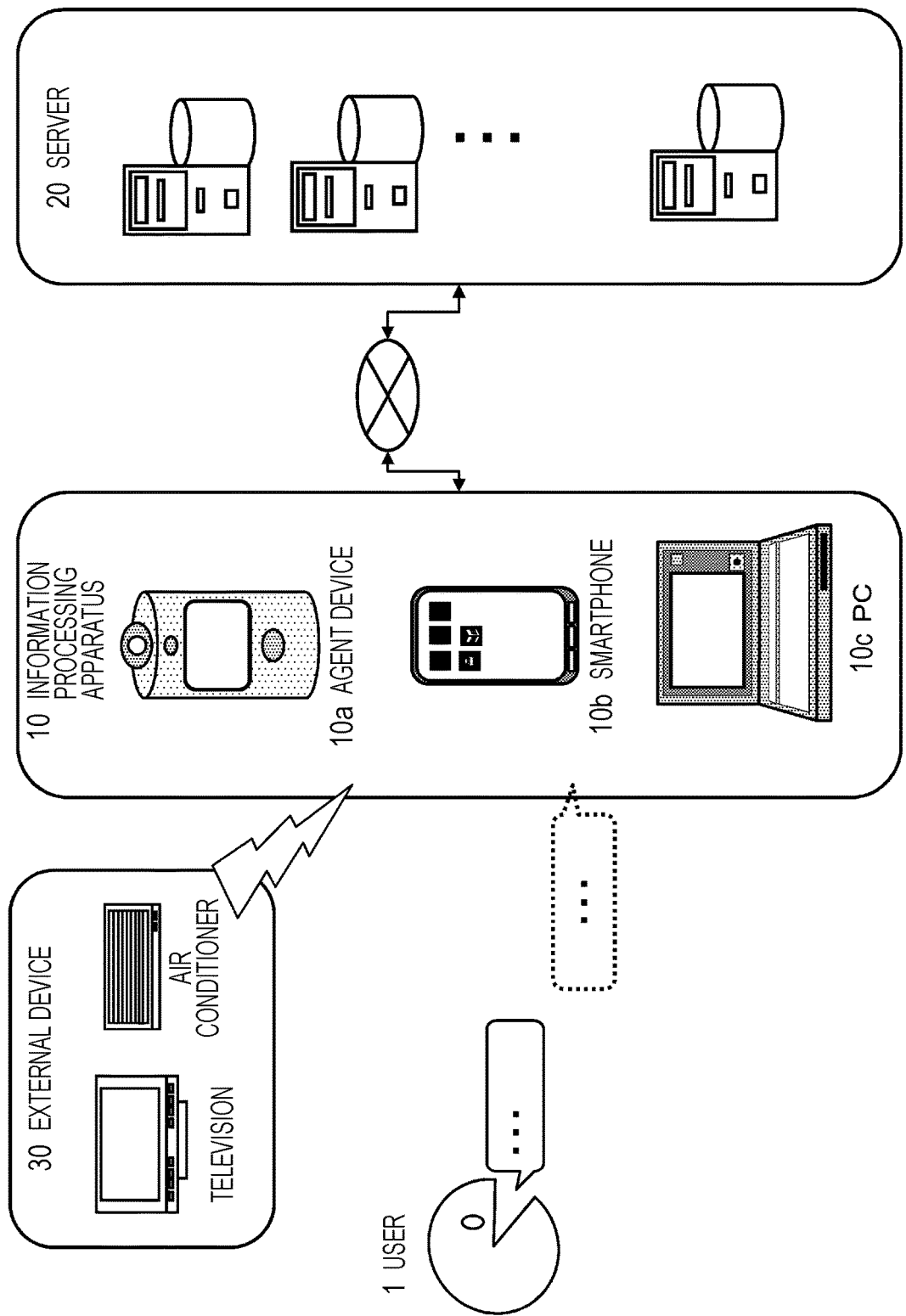
FIG. 2 is a diagram for describing a configuration example and a usage example of the information processing apparatus.

As illustrated in FIG. 2, the information processing apparatus 10 according to the present disclosure is not limited to an agent device 10a, and can be implemented in various apparatus forms such as a smartphone 10b and a PC 10c.

The information processing apparatus 10 recognizes an utterance of the user 1 and not only performs the response based on the user utterance but also, for example, executes control of an external device 30 such as a television and an air conditioner illustrated in FIG. 2 in accordance with the user utterance.

For example, in a case where the user utterance is a request such as "change the television channel to 1" and "change the set temperature of the air conditioner to 20 degrees", the information processing apparatus 10 outputs a control signal (Wi-Fi, infrared light, or the like) to the external device 30 on the basis of a speech recognition result of the user utterance, and executes control in accordance with the user utterance.

Note that the information processing apparatus 10 is connected to a server 20 via a network, and can acquire information, required to generate a response to a user utterance, from the server 20. Furthermore, the server may be configured to perform a speech recognition process and a semantic analysis process.

Next, a specific configuration example of the information processing apparatus will be described with reference to FIG. 3.

Figure 3:
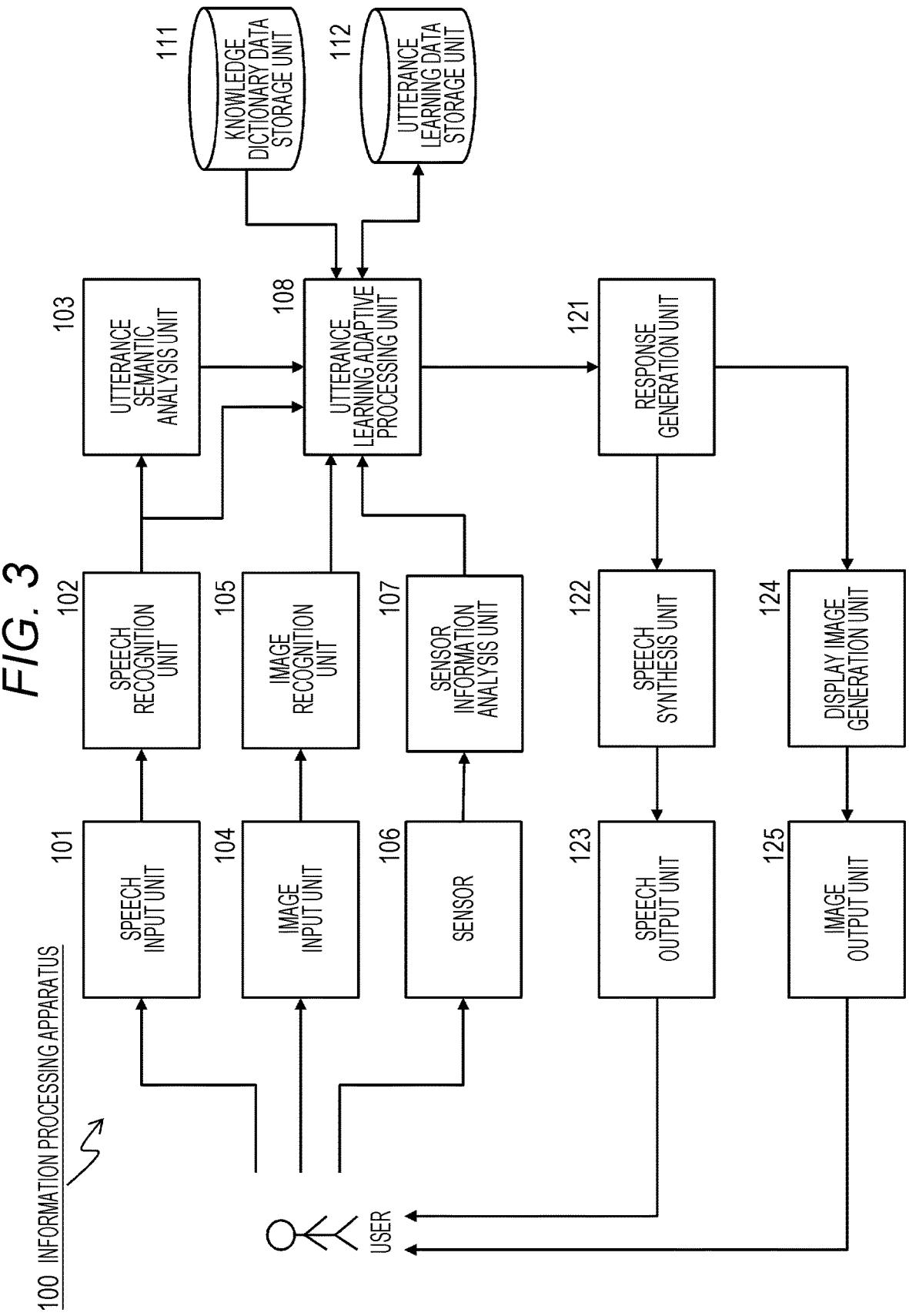
FIG. 3 is a diagram for describing a specific configuration example of the information processing apparatus.

FIG. 3 is a diagram illustrating a configuration example of an information processing apparatus 100 that recognizes a user utterance and performs a response.

As illustrated in FIG. 3, the information processing apparatus 100 includes a speech input unit 101, a speech recognition unit 102, an utterance semantic analysis unit 103, an image input unit 104, an image recognition unit 105, a sensor 106, a sensor information analysis unit 107, an utterance learning adaptive processing unit 108, a knowledge dictionary data storage unit 111, an utterance learning data storage unit 112, a response generation unit 121, a speech synthesis unit 122, a speech output unit 123, a display image generation unit 124, and an image output unit 125.

Note that all of these components can be also configured in the single information processing apparatus 100, but may be configured such that some configurations or functions are provided in another information processing apparatus or an external server.

A speech uttered by a user is input to the speech input unit 101 such as a microphone.

The speech input unit (microphone) 101 inputs the input user's uttered speech to the speech recognition unit 102.

The speech recognition unit 102 has, for example, an automatic speech recognition (ASR) function, and converts speech data into text data constituted by a plurality of words.

The text data generated by the speech recognition unit 102 is input to the utterance semantic analysis unit 103.

The utterance semantic analysis unit 103 selects and outputs a user s intent candidate included in the text.

The utterance semantic analysis unit 103 has, for example, a natural language understanding function such as natural language understanding (NLU), and estimates an intent of the user utterance and entity information. (entity) which is a meaningful element (significant element) included in the utterance from the text data.

A specific example will be described. For example, it is assumed that the following user utterance is input.

User utterance=tell me the weather for tomorrow afternoon in Osaka.

In this user utterance, an intent (intent) is to know the weather, and entity information (entities) is words of Osaka, tomorrow, and afternoon.

If an intent (intent) and entity information (entity) can be accurately estimated and acquired from a user utterance, the information processing apparatus 100 can perform accurate processing on the user utterance.

For example, it is possible to acquire the weather for tomorrow afternoon in Osaka and output the acquired weather as a response in the above example.

In practice, however, there is a case where a user utterance has poor articulation or a dialect, and is such a case, it is sometimes difficult to accurately estimate and acquire an intent (intent) and entity information (entity) of the user utterance.

The information processing apparatus 100 of the present disclosure has configurations to reduce the occurrence of such a situation.

One of such configurations is the utterance learning adaptive processing unit 108.

The following each data is input to the utterance learning adaptive processing unit 108.

(1) Text data generated on the basis of a user utterance by the speech recognition unit 102; and (2) Intent (intent) and entity information (entity) of the user utterance generated as the utterance semantic analysis unit 103 executes natural language understanding (NLU) on the text data.

Further, the following each information is also input to the utterance learning adaptive processing unit 108.

(3) Image recognition result information of the image recognition unit 105 with respect to an image of an uttering user and a periphery of the user acquired by the image input unit 104 such as a camera; and (4) Sensor analysis information analyzed by the sensor information analysis unit 107 on the basis of detection information of states of the uttering user and the periphery of the user acquired by the sensor 106.

The utterance learning adaptive processing unit 108 receives the above information of (1) to (4) as inputs, and executes a process of learning the user utterance including generation, correction, and discard of learning data of the user utterance.

Utterance learning data, which is a result data of the learning process executed in the utterance learning adaptive processing unit 108, is stored in the utterance learning data storage unit 112.

Details of this learning process will be described later.

After predetermined learning data has been stored in the utterance learning data storage unit 112, the utterance learning adaptive processing unit 108 performs a learning data adaptation process on a newly input user utterance. In other words, in a case where text data corresponding to the user utterance has been newly input, an intent (intent) and entity information (entity) for the user-specific utterance is estimated with reference to the learning data stored in the utterance learning data storage unit 112.

This estimation process can be executed as a more accurate process by using the learning data.

Note that knowledge dictionary data stored in the knowledge dictionary data storage unit 111 is used to refer to superordinate concepts and the like of words constituting a user utterance in a learning data generation process and an adaption process of the user utterance performed by the utterance learning adaptive processing unit 108.

The knowledge dictionary data storage unit 111 stores the knowledge dictionary data in which various facts and general knowledge such as common sense, customs, and experiences are converted into a database as computer-readable data. The knowledge dictionary data is also referred to as knowledge base dictionary data.

In this manner, the utterance learning adaptive processing unit 108 uses the learning data stored in the utterance learning data storage unit 112 or the knowledge dictionary data stored in the knowledge dictionary data storage unit 111 to estimate an intent (intent) and entity information (entities) with respect to the user-specific utterance.

Such an estimation result is input to the response generation unit 121.

The response generation unit 121 generates a response to the user on the basis of the intent (intent) and the entity information (entity) of the user utterance estimated by the utterance learning adaptive processing unit 108. The response is configured as at least any one of a speech or an image.

In a case of outputting a response speech, speech information generated by the speech synthesis unit 122 is output via the speech output unit 123 such as a speaker.

In a case of outputting a response image, display image information generated by the display image synthesis unit 124 is output via the image output unit 125 such as a display.

Next, a sequence of processing executed by the utterance learning adaptive processing unit 108 will be described with reference to a flowchart illustrated in FIG. 4.

Figure 4:
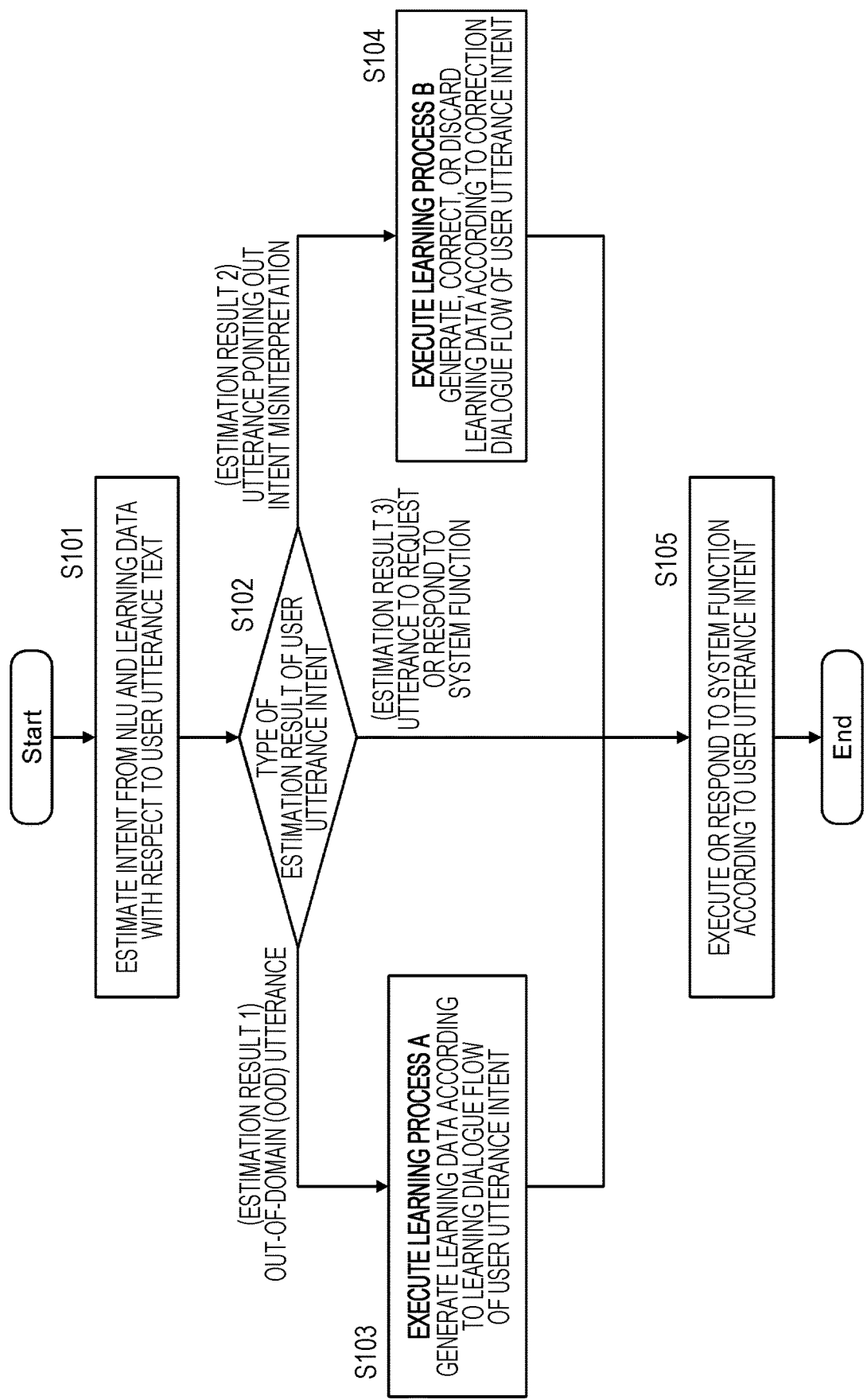
FIG. 4 is a flowchart illustrating processing executed by the information processing apparatus.

The processing according to the flowchart illustrated in FIG. 4 can be executed, for example, according to a program stored in the storage unit of the information processing apparatus 100.

The processing in the utterance learning adaptive processing unit 108 can be performed as program execution processing using a processor such as a CPU having a program execution function, for example.

Hereinafter, a process in each step of the flow illustrated in FIG. 4 will be described.

(Step S101)

First, in step S101, the utterance learning adaptive processing unit 108 acquires a result of natural language understanding (NLU), which has been executed by the utterance semantic analysis unit 103 on a user utterance, and applies learning data stored in the utterance learning data storage unit 112 to estimate an intent (intent) and entity information (entity) of the user utterance.

Note that the following analysis data for the user utterance is input to the utterance learning adaptive processing unit 108 as described above.

(1) Text data generated on the basis of the user utterance by the speech recognition unit 102;

(2) Intent (intent) and entity information (entity) of the user utterance generated as the utterance semantic analysis unit 103 executes natural language understanding (NLU) on the text data;

(3) Image recognition result information of the image recognition unit 105 with respect to an image of an uttering user and a periphery of the user acquired by the image input unit 104 such as a camera; and (4) Sensor analysis information analyzed by the sensor information analysis unit on the basis of detection information of states of the uttering user and the periphery of the user acquired by the sensor 106.

The utterance learning adaptive processing unit 108 searches for the text data corresponding to the user utterance whether there is data to which the utterance learning data that has been already stored in the utterance learning data storage unit 112 is applicable.

Note that. Details of such a learning data adaptation process will be described later.

In a case where the applicable data exists in the utterance learning data that has been already stored in the utterance learning data storage unit 112, the intent (intent) and the entity information (entity) of the user utterance are estimated using the learning data.

On the other hand, in a case where the applicable data does not exist in the utterance learning data that has been already stored an the utterance learning data storage unit 112, the intent (intent) and the entity information (entity) of the user utterance generated as the utterance semantic analysis unit 103 executes the natural language understanding (NLU) on the text data are directly used as the intent and entity information of the user utterance.

Note that the similar processing is performed even in a case where learning data itself does not exist in the initial state.

In the intent estimation process of step S101, the learning data stored in the utterance learning data storage unit 112 is applied.

Processing such as generation, correction, and discard of the learning data is executed in step S103 and step S109 to be described next.

In other words, the learning data stored in the utterance learning data storage unit 112 is sequentially updated by the learning process executed in step S103 and step S104 to be described next.

The process in step S101 is performed using the latest learning data stored in the utterance learning data storage unit 112.

A detailed sequence of such a process of estimating the intent (intent) and the entity information (entity) of the user utterance using the latest learning data will be described with reference to a flowchart illustrated in FIGS. 12 and 13 after giving a detailed description on the learning process executed in step S103 and step S104.

(Step S102)

In step S102, the utterance learning adaptive processing unit 108 classifies results of the process of estimating the intent (intent) and the entity information (entity) of the user utterance executed in step S101 into the following three results.

(Estimation Result 1) The user utterance is an out-of-domain (OOD) utterance.

(Estimation Result 2) The user utterance is an utterance pointing out an intent misinterpretation.

(Estimation Result 3) The user utterance is a request or a response utterance with respect to the information processing apparatus 100.

Note that an utterance that has failed to understand an intent (intent) and entity information (entity) of the user utterance is referred to as the out-of-domain (OOD) utterance.

The "out-of-domain (OOD) utterance" illustrated in the above (Estimation Result 1) indicates that it has failed to understand the intent (intent) and the entity information (entity) of the user utterance.

Even in a case where it has failed to estimate an intent (intent) and entity information (entity) of a user utterance by the natural language understanding (NLU) executed by the utterance semantic analysis unit 103, the user utterance is classified into (Estimation Result 1) "out-of-domain (OOD) utterance".

The similar description applies even to a case where a reliability score as attribute information, to be set in an intent (intent) and entity information (entity) of a user utterance estimated by the natural language understanding (NLU) executed by the utterance semantic analysis unit 103, is lower than a predetermined threshold.

The processing proceeds to step S103 in a case where a result of the process of estimating the intent (intent) and the entity information (entity) of the user utterance executed in step S101 has been determined as (Estimation Result 1) "The user utterance is an out-of-domain (OOD) utterance".

Furthermore, the processing proceeds to step S104 in a case where it has been determined as (Estimation Result 2) "The user utterance is an utterance pointing out an intent misinterpretation".

Moreover, the processing proceeds to step S105 in a case where it has been determined as (Estimation Result 3) "The user utterance is a request or a response utterance with respect to the information processing apparatus 100".

(Step S103)

As described above, the processing proceeds to step S103 in a case where the result of the process of estimating the intent (intent) and the entity information (entity) of the user utterance executed in step S101 has been determined as.

(Estimation Result 1) "The user utterance is an out-of-domain (ODD) utterance".

In this case, the utterance learning adaptive processing unit 108 executes a "learning process A" in step S103.

The learning process A is a process of executing learning dialogue flow of a user utterance intent.

When a true intent of a user utterance is acquired by executing this learning dialogue flow, learning data is generated and stored in the utterance learning data storage unit 112.

Details of the "learning process A=learning dialogue flow of user utterance intent" executed in step S103 will be described later.

(Step S104)

Furthermore, the processing proceeds to step S104 in a case where the result of the process of estimating the intent (intent) and the entity information (entity) of the user utterance executed in step S101 has been determined as (Estimation Result 2) "The user utterance is the utterance pointing out the intent misinterpretation".

In this case, the utterance learning adaptive processing unit 108 executes a "learning process B" in step S104.

The learning process B is a process of executing correction dialogue flow of a user utterance intent.

When a true intent of the user utterance is acquired by executing this correction dialogue flow of the user utterance intent, generation of learning data to be recorded in the utterance learning data storage unit 112 or correction of learning data that has been stored in the utterance learning data storage unit 112 is performed.

Note that learning data for the previous user utterance is discarded in a case where it has failed to obtain the true intent of the user utterance by the execution of this flow.

Details of the "learning process B=correction dialogue flow of user utterance intent" executed in step S104 will be described later.

(Step S105)

Moreover, the processing proceeds to step S105 in a case where the result of the process of estimating the intent (intent) and the entity information (entity) of the user utterance executed in step S101 has been determined as (Estimation Result 3) "The user utterance is a request or a response utterance with respect to the information processing apparatus".

In this case, the utterance learning adaptive processing unit 108 executes processing and response processing in accordance with the user utterance intent in step S105.

Note that the processing proceeds to step S105, and the processing and the response processing in accordance with the user utterance intent are executed even in a case where the true intent of the user utterance has been acquired by the execution of the "learning process A=learning dialogue flow of user utterance intent" in step S103 or the execution of the "learning process B=correction dialogue flow of user utterance intent" in step S104.

Specifically, for example, in a case where there has been a user utterance as follows:

User Utterance=tell me the weather for tomorrow afternoon in Osaka, the information processing apparatus 100 outputs weather information of tomorrow afternoon in Osaka in a speech via the speech output unit 123.

2. Regarding Details of Learning Dialogue Flow Executed by Utterance Learning Adaptive Processing Unit Next, a description will be given regarding the "learning process A=learning dialogue flow of user utterance intent" executed by the utterance learning adaptive processing unit 108 in step S103 of the flowchart of FIG. 4.

In this step S103, a learning data generation process and a learning data adaptation process are performed.

As described above with reference to FIG. 4, the "learning processing A=learning dialogue flow of user utterance intent" in step S103 of the flowchart of FIG. 4 is executed in a case where the information processing apparatus 100 has failed to interpret a user utterance intent (in the case of the OOD utterance).

A specific example of the "learning process A=learning dialogue flow of user utterance intent" executed in step S103 will be described with reference to FIG. 5.

As illustrated in FIG. 5, the user first utters "Read Suzuki's"

in step S121 with an intent to make the system (the information processing apparatus 100) read a message sent from Suzuki.

The information processing apparatus 100 converts "read" into a text as "four" in the speech recognition process, and determines that it is difficult to understand the intent of the user utterance.

In other words, a result of natural language understanding (NLU) of the user utterance is determined as "out-of-domain (OOD)" in step S122.

Note that the example illustrated in FIG. 5 illustrates an example of erroneous recognition of a speech recognition engine, but the information processing apparatus 100 sometimes determines a user utterance as the out-of-domain (OOD) even in a case of the user utterance having a dialect or a slang or a case of a stuttering utterance of a non-native user.

In a case where the utterance learning adaptive processing unit 108 of the information processing apparatus 100 has determined that the user utterance as the out-of-domain (OOD) in this manner, the "learning process A=learning dialogue flow of user utterance intent" is executed in step S103 of FIG. 4 described above.

Note that the user utterance does not have to be a verbally correct utterance in terms of the grammar or the like, and the "learning process A=learning dialogue flow of user utterance intent" is executed in a case where the user utterance is determined as the out-of-domain (OOD) even if the user utterance is user-specific wording.

This is because utterance words (a utterance text) of the user utterance is directly stored in the storage unit (the utterance learning data storage unit 112) as learning data in association with an intent (intent) of the user utterance in the learning process executed here.

When determining the user utterance as the out-of-domain (OOD) in step S122 illustrated in FIG. 5, the utterance learning adaptive processing unit 108 of the information processing apparatus 100 makes an inquiry of an uttering user in order to obtain a user utterance intent. In other words, an inquiry sentence regarding a "content of the OOD utterance of the user" determined as the out-of-domain (OOD) is generated by text to speech (TTS).

"Please tell me the meaning of "user's OOD utterance content"

Then, the above inquiry response is output.

Note that, as the inquiry sentence for the information processing apparatus 100 to acquire a user utterance intent in a case where it has determined as the out-of-domain (OOD), it is possible to use various words such as "Please rephrase", and "I don't understand, so please say in a different way".

"Please tell me the meaning of "with four of Suzuki""

The information processing apparatus 100 outputs the above inquiry response in step S123 in the example illustrated in FIG. 5.

The utterance learning adaptive processing unit 108 of the information processing apparatus 100 executes this inquiry, and then, analyzes a user utterance (in the example of FIG. 5, the user utterance in step S124="read message from Suzuki") executed within a pre-defined time (for example, within five seconds).

Specifically, the natural language understanding (NLU) result (or a learning data application result) of the user utterance "read message from Suzuki" is stored as a true utterance intent of "with four of Suzuki".

In other words, the result is stored in the utterance learning data storage unit 112 as the learning data.

However, in a case where there is no user utterance within the pre-defined time (for example, within five seconds) after the execution of the above inquiry in step S123, the learning dialogue flow is ended. In other words, learning data generation is not performed.

Furthermore, in a case where a user's re-utterance after the inquiry is also determined as the out-of-domain (OOD), an inquiry for acquisition of a user utterance intent is performed again and repeated until a true utterance intent can be acquired.

The repetition may be performed up to a pre-defined upper limit count, and the learning dialogue flow may be ended in a case of reaching an upper limit number of steps.

Furthermore, in a case where the repetition occurs and a true utterance intent has been acquired, only the user utterance determined as the out-of-domain (OOD) first may be stored as learning data in the storage unit (user's utterance=recorded as true utterance intent that has been acquired by repetition), or all the user utterances obtained by repeating the inquiry may be stored as learning data in the storage unit (user's utterance=recorded as true utterance intents that have been acquired by repetition).

In the example of FIG. 5,

"Tell me the meaning of "with four of Suzuki"", the information processing apparatus 100 outputs the above inquiry in step S123, and then, an utterance in step S124, in other words, a user utterance "read message from Suzuki" is made as the user utterance within the specified time (five seconds).

The information processing apparatus 100 stores the natural language understanding (NLU) result (or learning data application result) of the user utterance in step S124, in other words, "Read message from Suzuki", the user utterance as the true utterance intent of the true user utterance "with four of Suzuki" that has been determined earlier as the out-of-domain (OOD).

In other words, the result is stored in the utterance learning data storage unit 112 as the learning data.

In step S125 of FIG. 5, the information processing apparatus 100 stores the data illustrated in step S125 in the utterance learning data storage unit 112 as the learning data.

The data illustrated in step S125 of FIG. 5 is data in which an intent (intent) of the user utterance and entity information (entity) which is a meaningful element (significant element) included in the utterance have been recorded. This data is recorded in the utterance learning data storage unit 112 in association with the utterance text (utterance words) "with four of Suzuki".

In other words, the utterance learning adaptive processing unit 108 of the information processing apparatus 100 performs the learning process (a) illustrated at the bottom of FIG. 5 by the processes of steps S121 to S125 illustrated in FIG. 5. In other words, the learning data, which indicates that the user utterance "with four of Suzuki" is the user utterance including the following intention and entity information:

Intent (intent)=read message (READ_MESSAGE); and

Entity information (entity)=Suzuki, is generated and recorded in the utterance learning data storage unit 112.

After this learning process, the utterance learning adaptive processing unit 108 of the information processing apparatus 100 applies the response generation unit 121 or the like in step S126 to execute a process corresponding to the user utterance, in other words, a process of reading the message from Suzuki.

As an example of the learning data, FIG. 5(a) illustrates a configuration example of data of the following intent and entity information:

Intent (intent)=read message (READ_MESSAGE); and

Entity information (entity)=Suzuki.

In this manner, the learning data is correspondence data between the "user utterance" and the "intent and entity information data".

A specific data configuration example of learning data to be recorded in the utterance learning data storage unit 112 will be described with reference to FIG. 6.

An example of learning data in FIG. 6(a) is an example of learning data set for one user utterance.

A configuration example of entity information (entity) in FIG. 6(b) is a detailed data example of entity information (entity) that is constituent data of learning data in FIG. 6(a).

As illustrated in the learning data in FIG. 6(a), the learning data has the following constituent data.

(1) User utterance text (Speech)

(2) Intent (intent)

(3) Entity information (entity)

(4) attribute information of such values (user utterance date (date) and user utterance count (SpeechCount))

The data illustrated in FIG. 6(a) is learning data associated with a user utterance:

(1) user utterance text (Speech)="Do Kuwahara Keisuke".

Facts that, in this user utterance text (Speech)="do Kuwahara Keisuke", (2) an intent (intent) is music play (PLAY_MUSIC), and (3) entity information (entity) is each data illustrated in FIG. 6(b)

are recorded as learning data.

Note that.

(4) attribute information of such values (user utterance date (date) and user utterance count (SpeechCount))

is also recorded.

The "entity information (entity)" included in the learning data is, for example, constituted by each data illustrated in FIG. 6(b).

Note that the data illustrated in FIG. 6(b) is information regarding one entity included is the user utterance="Kuwahara Keisuke".

In a case where there is a plurality of entities in a user utterance, the data illustrated in FIG. 6(b) is registered for each entity.

As illustrated in FIG. 6(b), the following data is recorded as information regarding one entity="Kuwahara Keisuke".

(1) User utterance characters of entity (Literal)="Kuwahara Keisuke".

(2) Entity type (type)=play target (TARGET_MUSIC).

(3) As natural language processing information (nlpInfo) of entities:

(3a) Phrase type of clause including entity: noun phrase;

(3b) Case of clause including entity (indicating 5W1H such as prime case, time case, and place case, or a modification clause): continuous modification clause;

(3c) Linguistic semantic determination result of clause including entity: target, request, desire;

(3d) Part-of-speech and type of entity word: noun: common noun: proper noun: name: personage; and (3e) Superordinate semantic concept of entity word: content: music: personage.

As illustrated in FIG. 6(b), various types of entity information (entities) are recorded in the respective entity units in an entity information (entity) recording area of the learning data in FIG. 6(a).

Note that information to be recorded in these pieces of entity information (entities) can be acquired, for example, from dictionary data stored in the knowledge dictionary data storage unit 111.

In this manner, the learning data illustrated in FIG. 6, in other words, learning data including the following pieces of constituent data:

(1) User utterance text (Speech);
(2) Intent (intent);
(3) Entity information (entity); and
(4) Attribute information of such values (user utterance date (date) and user utterance count (SpeechCount))

is generated by the utterance learning adaptive processing unit 108 and stored in the utterance learning data storage unit 112.

For example, the data example illustrated in FIG. 5(a), which has been described regarding the learning process executed in step S103 illustrated in FIG. 4, is data of only a part, of learning data stored in the utterance learning data storage unit 112.

Even in the example illustrated in FIG. 5, learning data including pieces of constituent data similar to those described with reference to FIG. 6 is generated and stored in the storage unit. For example, the learning data includes the following pieces of data.

(1) User utterance text (Speech)=with four of Suzuki
(2) Intent (intent)=READ_MESSAGE
(3) Entity information (entity)=Suzuki
(4) Attribute information of such values (user utterance date (date) and user utterance count (SpeechCount))

In the learning process A of step S103 illustrated in FIG. 4, learning data having all these pieces of data is generated in the utterance learning adaptive processing unit 108 and stored in the utterance learning data storage unit 112.

Next, a description will be given regarding a specific example of a "learning process" based on a certain user utterance, and recognition and an intent estimation process of the user utterance using a result of the learning process, in other words, an "adaptation process" of learning result data with reference to FIGS. 7 and 8.

Figure 7:
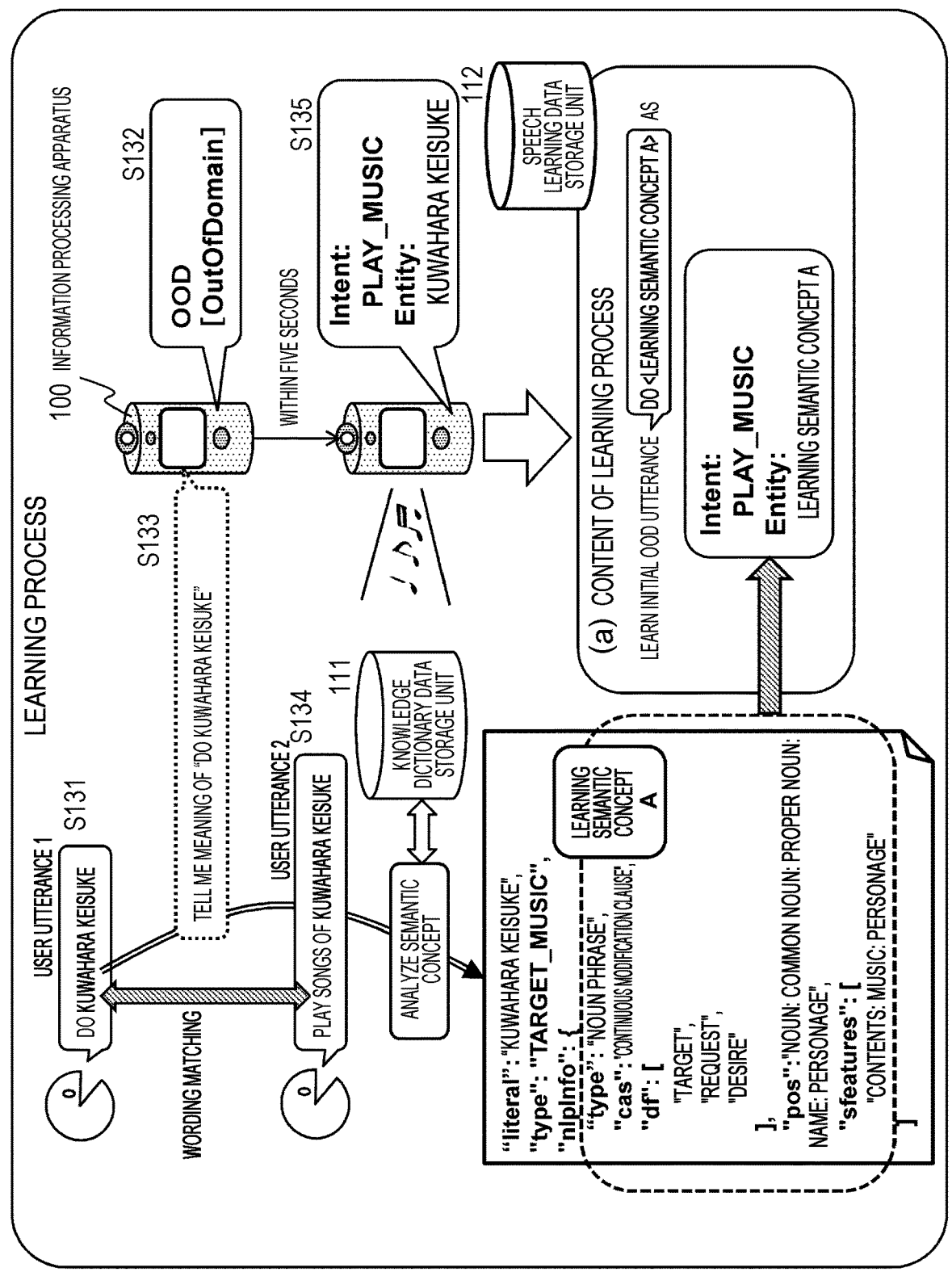
FIG. 7 is a diagram for describing a "learning process" based on a user utterance, recognition of the user utterance using a learning process result, and a specific example of an intent estimation process.

FIG. 7 is a diagram for describing a specific example of the "learning process" based on a certain user utterance.

As illustrated in FIG. 7, first, the user utters, in step S131, "Do Kuwahara Keisuke"

with an intention of desiring to listen to a song of the musician Kuwahara Keisuke.

The information processing apparatus 100 determines that it is difficult to understand the intent of "do Kuwahara Keisuke".

In other words, a result of natural language understanding (NLU) of the user utterance is determined as "out-of-domain (OOD)" in step S132.

In a case where the utterance learning adaptive processing unit 108 of the information processing apparatus 100 has determined that the user utterance as the out-of-domain (OOD) in this manner, the "learning process A=learning dialogue flow of user utterance intent" is executed in step S103 of FIG. 4 described above.

When determining the user utterance as the out-of-domain (OOD) in step S132 illustrated in FIG. 7, the utterance learning adaptive processing unit 108 of the information processing apparatus 100 makes an inquiry of an uttering user in order to obtain a user utterance intent.

In other words, in step S133, an inquiry sentence regarding "content of the OOD utterance of the user" determined as the out-of-domain (OOD) is generated by text to speech (TTS).

"Please tell me the meaning of "do Kuwahara Keisuke""

Then, the above inquiry response is output.

The utterance learning adaptive processing unit 108 of the information processing apparatus 100 executes such an inquiry, and then, stores a natural language understanding (NLU) result (or learning data application result) of a user utterance, which has been executed within a pre-defined time (for example, within five seconds), the user utterance in step S134 in the example of FIG. 7, in other words, the user utterance, "Play a song of Kuwahara Keisuke",
as an intent of the user utterance that has been determined as OOD first, an other words,
the user utterance, "Do Kuwahara. Keisuke".

In other words, the utterance learning adaptive processing unit 108 obtains the following data:

Intent (intent)=music play (PLAY_MUSIC); and
Entity information (entity)=Kuwahara Keisuke,
as a true intent, from the user utterance (teacher utterance), "Play a song of Kuwahara Keisuke".

Since the entity information (entity)=Kuwahara Keisuke, and this data is included an the user utterance "do Kuwahara Keisuke" which has been determined as the "out-of-domain (OOD) utterance" in step S131, [Learning Semantic Concept A], which is a result of the part of "Kuwahara Keisuke" obtained by natural language processing of the OOD utterance using a knowledge dictionary, is stored in the learning data.

As illustrated in FIG. 7, [Learning Semantic Concept A] includes natural language processing information (nlpInfo) of entities, in other words, at least any of the following pieces of information:

(a) Phrase type of clause including entity: noun phrase;
(b) Case of clause including entity (indicating 5W1H such as prime case, time case, and place case, or a modification clause): continuous modification clause;

(c) Linguistic semantic determination result of clause including entity: target, request, desire;

(d) Part-of-speech and type of entity word: noun: common noun: proper noun: name: personage; and (e) Superordinate semantic concept of entity word: content: music: personage.

The learning data in which these pieces of the natural language processing information (nlpInfo) of entities is associated as [Learning Semantic Concept A] with the intent (intent) is generated and stored in the utterance learning data storage unit 112.

Note that (e) superordinate semantic concept of entity word is information indicating a type of entity information (entity). Specifically, the superordinate semantic concept is information that enables makes it possible to identify a category to which a word belongs, for example, a word whose entity information word indicates a music-related artist, a word whose entity information (entity) word indicates a movie title, a word whose entity information (entity) word indicates a game title, a word whose entity information (entity) word indicates a city name, or the like.

Note that the superordinate semantic concept can be acquired from the knowledge dictionary data stored in the knowledge dictionary data storage unit 111.

In this manner, the utterance learning adaptive processing unit 108 stores the superordinate semantic concept of the entity information (entity) in the utterance learning data storage unit 112 as the learning data. Since the learning data is recorded to include the above data, the utterance learning adaptive processing unit 108 can selectively acquire learning data having a superordinate semantic concept similar to a superordinate semantic concept of entity information (entity) included in a new user utterance in a later intent analysis process of the new user utterance, and estimate the intent (intent) recorded in the learning data as an intent of the new user utterance.

This process will be described later with reference to FIG. 8.

As described above, the utterance learning adaptive processing unit 108 generates the learning data in which the natural language processing information (nlpInfo) including the superordinate semantic concept of the entity information (entity) included in the user utterance, in other words, [Learning Semantic Concept A] is associated with the intent (intent), and stores the generated learning data in the utterance learning data storage unit 112.

In other words, as described with reference to FIG. 7, the utterance learning adaptive processing unit 108 analyzes a plurality of user utterances input from the user, generates the learning data in which entity information (entity) included in a user utterance with an unclear intent is associated with a correct intent, and stores the generated learning data in the utterance learning data storage unit 112.

As described with reference to FIG. 7, after an input of a first user utterance with an unclear intent, an apparatus utterance for confirmation of an intent is executed to receive an input of a second user utterance, which is a response utterance from the user with respect to the apparatus utterance, and the learning data in which an intent acquired as an analysis result of the second user utterance is recorded in association with the entity information included in the first user utterance is generated and stored in the utterance learning data storage unit 112.

Specifically, for example, learning data in which the entity information (Kuwahara Keisuke) commonly included in the first user utterance and the second user utterance is associated with the correct intent (intent) is generated and stored in the utterance learning data storage unit 112.

As illustrated in FIG. 7(a), data including:

Intent (intent)=music play (PLAY_MUSIC); and

Entity information (entity)=[Learning Semantic Concept A].

The utterance learning adaptive processing unit 108 generates learning data having such correspondence data between the intent and the entity information (entity), and stores the generated learning data in the utterance learning data storage unit 112.

Note that this learning data is stored in association with User utterance text (Speech) "Kuwahara Keisuke".

The overall configuration of the learning data is the same as described above with reference to FIG. 6.

Next, a description will be given regarding a specific example of the recognition and intention estimation process of the user utterance using the learning data generated by the above learning process, in other words, the "adaptation process" of learning result data with reference to FIG. 8.

Figure 8:
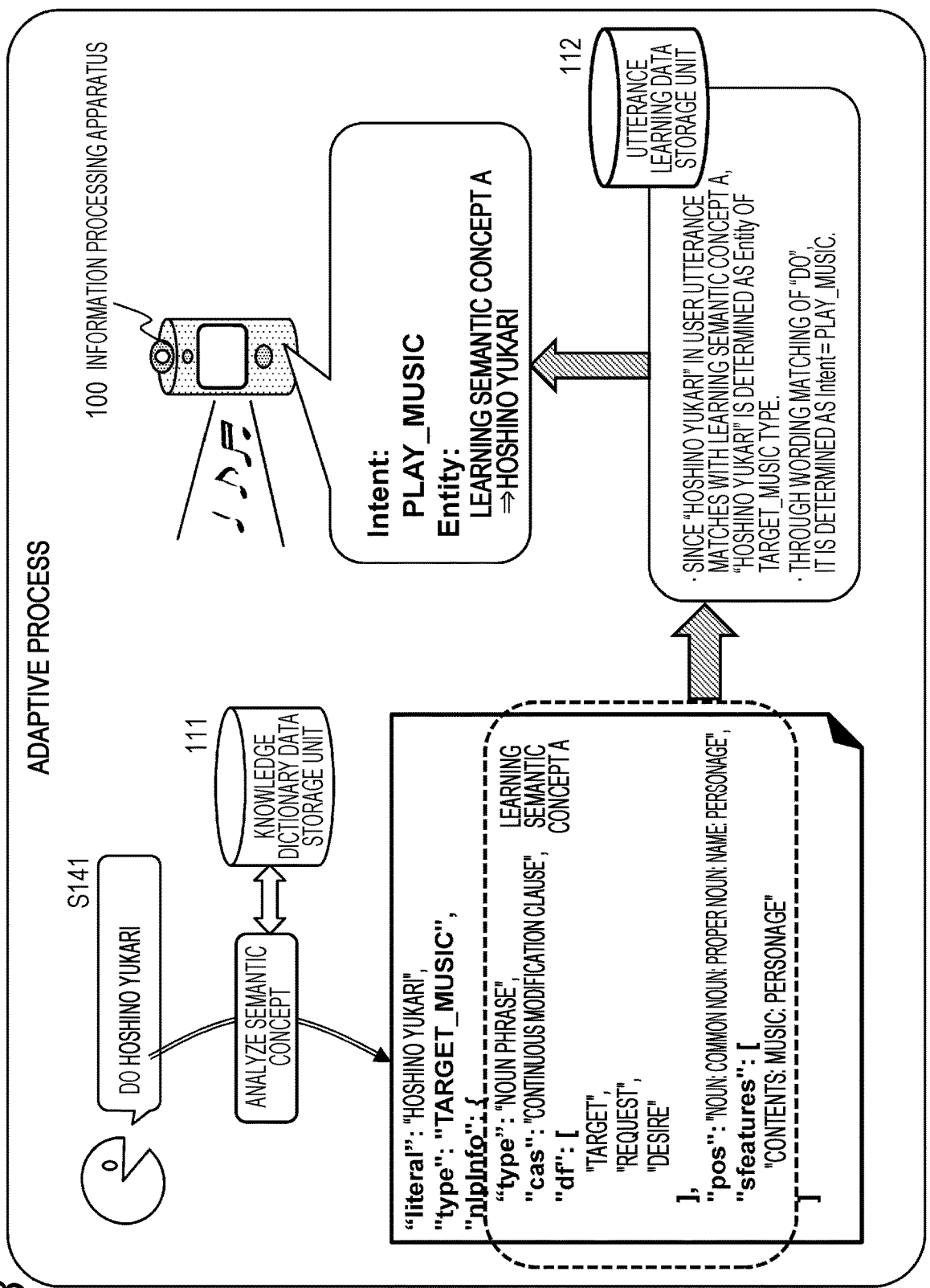
FIG. 8 is a diagram for describing a "learning process" based on a user utterance, recognition of the user utterance using a learning process result, and a specific example of an intent estimation process.

FIG. 8 is an execution example of processing with respect to an user utterance after the learning data generated in the learning process described in FIG. 7, in other words, the learning data including the following correspondence data between the intent (intent) and the entity information (entity), is stored in the utterance learning data storage unit 112.

Data including;

Intent (intent)=music play (PLAY_MUSIC); and

Entity information (entity)=[Learning Semantic Concept A].

As illustrated in FIG. 8, the user first utters in step S141, "Do Hoshino Yukari"

with an intention of desiring to listen to a song of the musician Hoshino Yukari.

The utterance learning adaptive processing unit 108 of the information processing apparatus 100 acquires information regarding "Hoshino Yukari" from the knowledge dictionary data storage unit 111 for the user utterance="Hoshino Yukari"

using the entity information (entity)=Yukari Hoshino. The information to be acquired includes natural language processing information (nlpInfo) of entities, in other words, the following pieces of information:

(a) Phrase type of clause including entity: noun phrase;

(b) Case of clause including entity (indicating 5W1H such as prime case, time case, and place case, or a modification clause): continuous modification clause;

(c) Linguistic semantic determination result of clause including entity: target, request, desire;

(d) Part-of-speech and type of entity word: noun: common noun: proper noun: name: personage; and (e) Superordinate semantic concept of entity word: content: music: personage.

In other words, the information to be acquired is the information that corresponds to [Learning Semantic Concept A] described above.

The utterance learning adaptive processing unit 108 searches the utterance learning data storage unit 112 for learning data in which [Learning Semantic Concept A], similar to [Learning Semantic Concept A] corresponding to the entity information (entity)=Hoshino Yukari included in the user utterance, the user utterance="Hoshino Yukari", has been registered.

As such a search result, learning data including correspondence data between an intent (intent) and entity information (entity), the data including:

Intent (intent)=music play (PLAY_MUSIC); and

Entity information (entity)=[Learning Semantic Concept A], is extracted.

This learning data is the learning data stored in the utterance learning data storage unit 112 by the learning process which has been described above with reference to FIG. 7.

Note that this learning data is stored in association with

User utterance text (Speech)="Kuwahara Keisuke".

On the basis of this learning data, the utterance learning adaptive processing unit 108 determines that "Hoshino Yukari" included in the user utterance is one piece of learning data recorded matches with one piece of learning data recorded as the learning data, is other words, the learning data recording the correspondence data, the data including:

Intent (intent)=music play (PLAY_MUSIC); and

Entity information (entity)=[Learning Semantic Concept A].

User utterance="Hoshino Yukari"

Moreover, a constituent part "do" of an utterance text (utterance words) other than "Hoshino Yukari", which is the entity information (entity) included in the user utterance, is determined to match with User utterance text (Speech)="Do Kuwahara Keisuke" recorded in the learning data.

On the basis of such results, the utterance learning adaptive processing unit 108 determines an intent (intent) of the user utterance executed in step S141 illustrated in FIG. 8, in other words, the user utterance, "Do Hoshino Yukari"

as Intent (intent)=music play (PLAY_MUSIC).

If all the words of a user utterance are learned, and the learning result is applied only at the time of complete matching of the words, it is difficult to cope with an utterance in which only the content of entity information (entity) is different.

However, the utterance learning adaptive processing unit 108 of the present disclosure is configured to learn a semantic concept of entity information (entity) included in a user utterance using a knowledge base dictionary, and store the learned semantic concept in the storage unit (utterance learning data storage unit 112) as learning data.

As a result, it is possible to estimate the user intent using learning data in which the semantic concept of the entity information (entity) included in the user utterance is common.

Note that the semantic concept of entity information (entity) also includes the superordinate semantic concept of the entity word, in other words, information indicating the type of entity information (entity) as described above.

Therefore, in the configuration that enables processing by comparison with a "learning semantic concept" recorded in the storage unit as the learning data, for example, the following processing is possible.

It is possible to perform processing such as

Music play with "do <learning semantic concept=artist names", and

Recipe presentation with "do <learning semantic concept=food>".

In this manner, the user utterance as the learning data and the entity information (entity) included in the user utterance are recorded in association with the "learning semantic concept" including the superordinate semantic concept indicating the type of entity information (entity) so that it is possible to extract learning data that has the common semantic concept of entity information (entity) with respect to a later new user utterance, and interpret an intent (intent) set in the learning data as an intent (intent) of the new user utterance.

In other words, in an intent analysis process of a new user utterance, for example, the utterance learning adaptive processing unit 108 of the information processing apparatus 100 of the present disclosure can execute a process of acquiring superordinate semantic concept information of entity information included in the new user utterance and extracting, from the storage unit, learning data in which superordinate semantic concept information similar to the acquired information has been recorded, and estimating an intent recorded in the extracted learning data as an intent of the new user utterance.

3. Regarding Processing for Polysemic Word as Identical Utterance Data Having Various Meanings Next, a description will be given regarding processing for a polysomic word as identical utterance data having various meanings In the configuration that enables processing by comparison with a "learning semantic concept" recorded in the storage unit as the learning data, for example, the following processing is possible as described above.

It is possible to perform processing such as

Music play with "do <learning semantic concept=artist name>", and

Recipe presentation with "do <learning semantic concept=food>".

However, there is a case where entity information (entity) included in a user utterance is a polysemic word as the identical utterance data having various meanings.

For example, there is

Food name=blueberry.

Moreover, there is

Artist name=Blueberry.

In this case, it is difficult for the information processing apparatus 100 to determine which one of the music play and the recipe presentation need to be performed in a case where there is the following user utterance, User utterance="Do blueberry"

as the user utterance.

The following two configuration examples to solve such a problem will be described hereinafter.

Polysemic Word Countermeasure Configuration Example 1

Dialogue states (states) at the time of execution of user utterances are divided, and individual pieces of learning data in units of the divided states are generated and recorded.

Polysemic Word Countermeasure Configuration Example 2

Learning data in which situation information (context) at the time of user's uttering has been recorded together with an intent (intent) of the user utterance is generated and recorded.

Hereinafter, these configuration examples will be sequentially described.

Polysemic Word Countermeasure Configuration Example 1

Dialogue states (states) at the time of execution of user utterances are divided, and individual pieces of learning data in units of the divided states are generated and recorded.

First, a configuration example in which the dialogue states (states) at the time of execution of user utterances are divided, and individual pieces of learning data in units of divided states are generated and recorded will be described as Polysemic Word Countermeasure Configuration Example 1 with reference to FIG. 9.

Figure 9:
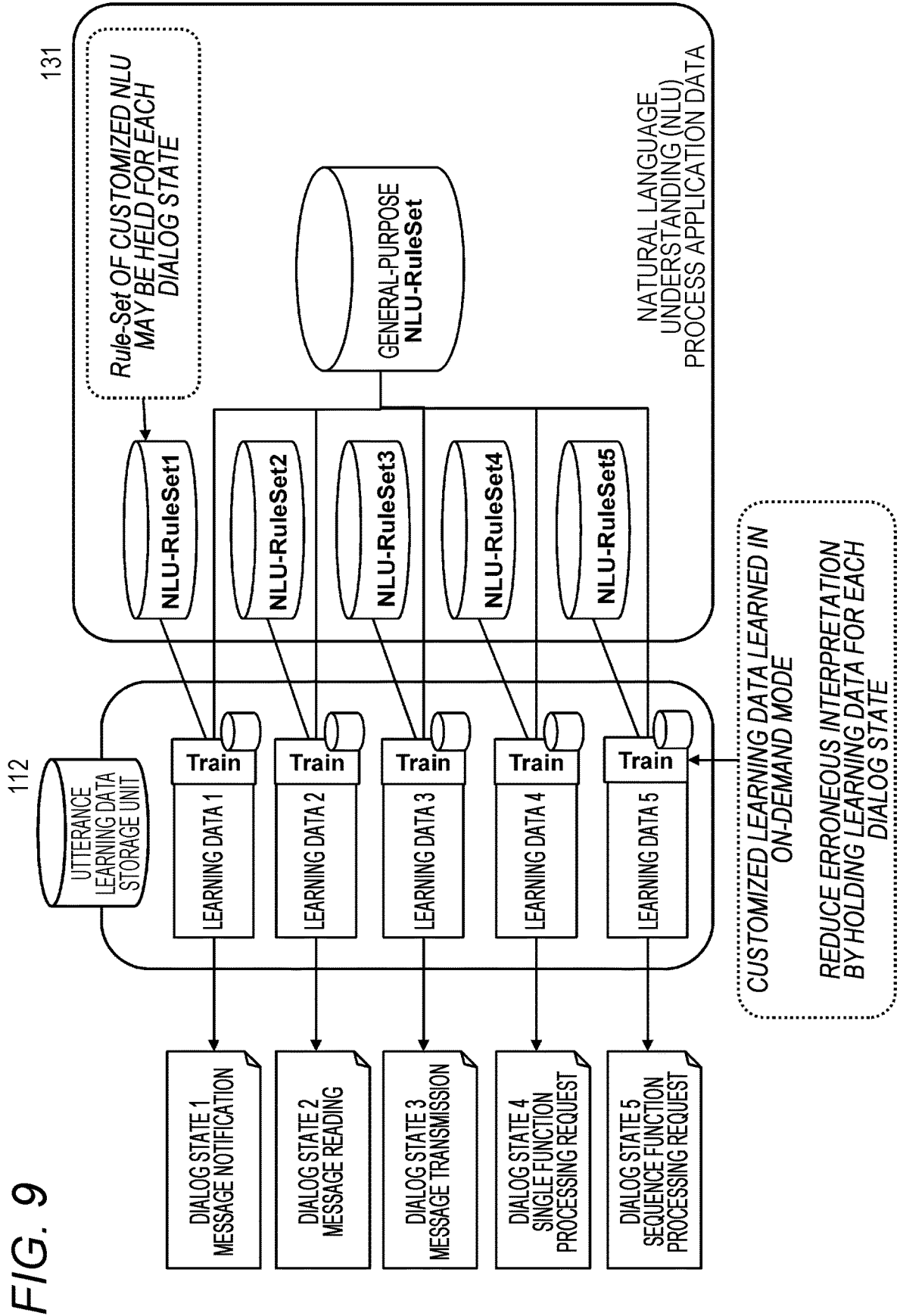
FIG. 9 is a diagram for describing a configuration example in which dialogue states (states) at the time of execution of user utterances are divided, and individual pieces of learning data in units of divided states are generated and recorded.

As illustrated in FIG. 9, learning data stored in the utterance learning data storage unit 112 is divided in accordance with a dialogue state (state) at the time of execution of a user utterance, and is set as individual learning data to the unit of the divided state.

The division of the dialogue states (state) at the time of execution of the user utterances is performed to be divided into, for example, the following five states as illustrated in FIG. 9.

State 1=message notification state state
State 2=message reading state
State 3=message transmission state
State 4=single function processing request state
State 5=sequence function processing request state Note that this state division is an example, and other division settings may be used.

For example, it may be configured to perform state division in accordance with a content of a dialogue between the user and the apparatus.

Specifically, there may be a food state for a dialogue content between the user and the apparatus relating to a talk about food or cooking, a music state for a talk about music, a sports state for a talk about sports, a trip state for a talk about a trip, and the like.

Learning data and NLU corresponding to states in units of states are set and used in accordance with the content of each dialogue.

The utterance learning adaptive processing unit 108 determines the state in accordance with the situation when the user utterance has been executed. Moreover, the learning data to be stored in the utterance learning data storage unit 112 is also stored in a storage area divided in units of states.

When the learning process is executed to execute the generation, update, or the like of learning data, a storage area to be used is determined in accordance with the determined state.

Natural language understanding (NLU) processing application data 131 used in the learning process is also divided into data in units of states, and data optimum for each state is used.

Since both the learning data and the natural language understanding (NLU) processing application data are set to data in units of states in accordance with the situation when the user utterance has been executed, the user utterance intent estimation can be performed using the data in accordance with each state.

As a specific example, for example, considered is a correspondence example in a case where the following user utterance has been made.

User utterance="Do blueberry"

In a case where the information processing apparatus 100 first outputs, as an apparatus utterance, "What do you want, to eat?", and
User utterance="Do blueberry"

has been input after the above-described utterance, the utterance learning adaptive processing unit 108 of the information processing apparatus 100 determines that this dialogue state relates to the food state, and executes processing in which learning data and NLU data corresponding to the food state are applied.

With this processing, the information processing apparatus 100 can present a recipe using the blueberry which is food.

Furthermore, in a case where the information processing apparatus 100 first outputs, as an apparatus utterance, "Which song do you want to play?", and
User utterance="Do blueberry"

has been input after the above-described utterance, the utterance learning adaptive processing unit 108 of the information processing apparatus 100 determines that this dialogue state relates to the music state, and executes processing in which learning data and NLU data corresponding to the music state are applied.

With this processing, the information processing apparatus 100 can play a song of Blueberry who is a musician.

Since the learning data and the NLU data are divided in accordance with the dialogue state in this manner, it is possible to accurately grasp the user's intent with respect to the user utterance including the polysemic word.

Polysemic Word Countermeasure Configuration Example 2

Learning data in which situation information (context) at the time of user's uttering has been recorded together with an intent (intent) of the user utterance is generated and recorded.

Next, a configuration example in which the learning data in which situation information (context) at the time of user's uttering has been recorded together with an intent (intent) of the user utterance is generated and recorded will be described as Polysemic Word Countermeasure Configuration Example 2.

The utterance learning adaptive processing unit 108 of the information processing apparatus 100 executes a learning process on a user utterance to generate learning data, but this learning data is the data that has been described above with reference to FIG. 6, in other words, the data including the following pieces of data.

(1) User utterance text (Speech)
(2) Intent (intent)
(3) Entity information (entity)
(4) Attribute information of such values (user utterance date (date) and user utterance count (SpeechCount))

Moreover, context information such as the following environment information and user information is recorded in learning data in order to realize accurate intent estimation for a polysemic word.

(a) Time information (morning/in the morning/midday/afternoon/evening/night/in the night)
(b) Apparatus use state information (during music play/during video play/during a game)
(c) User state information (user's position/face orientation/gaze direction)
(d) External device use information (TV ON or OFF/radio ON or OFF/air conditioner ON or OFF, and the like)

The context information such as the environment information and the user information is additionally recorded in the learning data corresponding to the user utterance that has been described with reference to FIG. 6.

The utterance learning adaptive processing unit 108 of the information processing apparatus 100 executes the user utterance intent estimation using learning data in which such context information has been recorded.

In a case where a plurality of pieces of learning data among pieces of the learning data is selected as application candidates due to the polysemy of entity information (entity) included in a user utterance, a similarity between context information at the time of generating each candidate learning data and context information at the time of execution of a new user utterance that is an intent estimation target is calculated, learning data with the highest similarity is selected, and an intent (intent), which has been recorded in the selected learning data, is determined as an intent (intent) of the new user utterance that is the intent estimation target.

Note that, for the calculation of the similarity of context information, it is possible to perform a process of generating vectors of the number of dimensions in accordance with the number of types of the respective pieces of context information and calculating the similarity on the basis of a vector distance (such that the similarity is higher as the distance is closer).

A description will be given regarding a specific example in which context information is recorded in learning data, and user utterance intent estimation is performed using the learning data.

It is assumed that an identical title, for example, "Blue Sky X" is used between a music title and a game title.

It is assumed that the following utterance has been made as a user utterance.

User utterance="Please, Blue Sky X"

Here, context at a point in time when the user utterance has been made is acquired.

Specifically, the following pieces of context information are acquired:

What the user is doing (playing music or playing a game); and

Apparatus use state (a game machine is ON or OFF).

For example, in a case where the utterance learning adaptive processing unit 108 of the information processing apparatus 100 has obtained context information that the user is playing a game at the time of the user utterance and the game machine is in the used state (ON), the utterance learning adaptive processing unit 108 of the information processing apparatus 100 selects learning data in which context information similar to such context information has been recorded.

Moreover, an intent (intent) recorded in the selected learning data is acquired.

The acquired intent (intent) is recorded as play of the game "Blue X".

As a result, the utterance learning adaptive processing unit 108 of the information processing apparatus 100 understands an intention of the following user utterance, User utterance="Please, Blue Sky X"

as an intent of desiring play of the game "Blue Sky X", and starts to play the game.

On the other hand, for example, in a case where context information that the user is playing music at the time of the user utterance and the game machine is in the unused state (OFF) has been obtained, the utterance learning adaptive processing unit 108 of the information processing apparatus 100 selects learning data in which context information similar to such context information has been recorded.

Moreover, an intent (intent) recorded in the selected learning data is acquired.

The acquired intent (intent) is recorded as play of the music "Blue Sky X".

As a result, the utterance learning adaptive processing unit 108 of the information processing apparatus 100 understands an intention of the following user utterance, User utterance="Please, Blue Sky K"

as an intent of desiring play of the music "Blue Sky X", and starts to play the music.

Since the learning data is recorded together with the context such as the environment information and the user information at the time of the user utterance in this manner, it is possible to improve the accuracy of the user intent estimation based on the similarity determination of the context.

Note that there are various processing examples as follows, for example, as the processing example using the context information.

Specific Example 1

User utterance="Show me Mezamashi (a polysemic word in. Japanese indicating an alarm and a television program in Japan)"

Usage context=time information, external device information.

If an uttering user watches a television at a fixed time in the morning, a channel is changed to "Mezamashi (program) ".

If the utterance is made at another time, the time of an alarm is presented.

Specific Example 2

User utterance="Is there something in blueberry?"

Usage context=user state

If a user is cooking in the kitchen, a recipe using the blueberry (food) is presented.

If the user is in the living room, a song of Blueberry (artist) is played.

Specific Example 3

User utterance="Mail to father"

Usage context=user state

If an uttering user is a child of the family, a mail is sent to the child's father.

If the uttering user is the father of a child, a mail is sent to the (child's) grandfather.

Specific Example 4

User utterance="Volume up"

Usage context=user state

Turn up the volume in a direction (a TV or the like) where an uttering user is watching.

Specific Example 5

User utterance="Tell me how to cut (how to burn)"

Usage context=user state

When an uttering user is in the kitchen, "how to cut (how to burn) as a recipe" is presented.

When the uttering user is operating a device such as a PC, "how to turn off the power as a device operation method, how to burn on media" is presented.

Specific Example 6

User utterance="Tell me Tako No Agekata"

Usage context=user state

When an uttering user is in the kitchen, how to fry an "octopus" is presented as a recipe.

If a child appears near the uttering user, how to raise a "kite", which is a way of playing, is presented.

In this manner, the learning data is recorded together with the context information including the environment information and the user information at the time of the user utterance, and the collation between the context acquired at the time of a new user utterance and the context recorded in the learning data is performed, so that it is possible to perform more correct intent estimation even in a case where the user utterance includes the polysemic word.

4. Regarding Countermeasures Against Erroneous Learning Process

The utterance learning adaptive processing unit 108 of the information processing apparatus 100 of the present disclosure generates the learning data to correctly execute the user utterance intent estimation by the learning process of the user utterance, and further, performs the utterance intent estimation using the learning data.

However, there is also a possibility that the learning process is erroneously executed to generate erroneous learning data.

For example, it is assumed that the utterance learning adaptive processing unit 108 of the information processing apparatus 100 has uttered:

Apparatus utterance="Please tell me the meaning of XX", as an inquiry utterance with respect to a user to confirm an intent of the user utterance.

There is a case where a user with a bad intent utters a complete nonsense with respect to the apparatus utterance.

For example,

User utterance="Do Kuwahara Keisuke"

Apparatus utterance="Please tell me the meaning of "Kuwahara Keisuke""

after the above dialogue is executed, the user may execute the following utterance.

User utterance="Set alarm at 2 a.m."

In such a case, the utterance learning adaptive processing unit 108 of the information processing apparatus 100 is likely to generate erroneous learning data.

Hereinafter, a description will be given regarding a configuration in which it is possible to prevent such generation of erroneous learning data due to erroneous learning and storage processing in the storage unit (the utterance learning data storage unit 112).

The following two configuration examples will be described.

Erroneous Learning Countermeasure Configuration Example 1

A degree of difference of a semantic concept of entity information (entity) is verified by linguistic analysis so as to prevent erroneous learning.

Erroneous Learning Countermeasure Configuration Example 2

An application range of learning data using personal identification based on an image is determined so as to prevent erroneous learning.

Hereinafter, these configuration examples will be sequentially described.

Erroneous Learning Countermeasure Configuration Example 1

A degree of difference of a semantic concept of entity information (entity) is verified by linguistic analysis so as to prevent erroneous learning.

First, a configuration in which the degree of the difference of the semantic concept of entity information (entity) is verified by linguistic analysis so as to prevent erroneous learning will be described as Erroneous Learning Countermeasure Configuration Example 1.

In this erroneous learning preventing process, in a case where the utterance learning adaptive processing unit 108 of the information processing apparatus 100 has determined that a user utterance is an "out-of-domain (OOD) utterance", this "out-of-domain (OOD) utterance" is subjected to linguistic analysis to extract a semantic concept of an object case and a subject case that are candidates for entity information (entity) included in the user utterance.

This process is executed, for example, at a point in time when the user utterance is determined as the "out-of-domain (OOD) utterance" in step S102 of the flow illustrated in FIG. 4, which has been described above, and the processing proceeds to step S103.

The utterance learning adaptive processing unit 108 of the information processing apparatus 100 extract semantic concepts of the object case and the nominative case, which are candidates for entity information (entity) included in the following two utterances:

(1) The user's first utterance, in other words, the user utterance determined as the "out-of-domain (OOD) utterance"; and (2) The user rephrasing utterance in response to a later inquiry from the information processing apparatus 100.

Moreover, the degree of difference between the meanings of the semantic concepts of the candidates of entity information (entities) of these two utterances is determined on the basis of a meaning vector distance or the like.

It is determined that two utterances are similar as the vector distance between the entities of the two utterance is shorter.

On the other hand, it is determined that two utterances are non-similar as the vector distance between the entities of the two utterance is farther.

After calculating the vector distance between entities of the two utterance, the utterance learning adaptive processing unit 108 of the information processing apparatus 100 uses a pre-defined threshold is used to compare the vector distance between the two utterance entities.

In a case where the vector distance between the two utterance entities is the threshold or larger, it is determined that the two utterances are not similar, in other words, irrelevant utterances, and the user's rephrasing utterance is excluded from a target of the learning process.

In the utterance examples described above, the semantic concepts of the two utterances are as follows.

(1) Entity information (entity) in the user's first utterance, in other words, the user utterance determined as the "out-of-domain (OOD) utterance"=a semantic concept of Kuwahara Keisuke=<Artist>

(2) Entity information (entity) in the user's rephrasing utterance in response to the later inquiry from the information processing apparatus 100=a semantic concept of 2:00 a.m.=<Time>.

The utterance learning adaptive processing unit 108 of the information processing apparatus 100 calculates a similarity between these semantic concepts, the following semantic concepts of the two utterances:

<Artist>; and
<Time>, on the basis of, for example, the vector distance.

It is determined that the vector distance is larger than the prescribed threshold and the similarity is low. As a result, the user's rephrasing utterance is excluded from the target of the learning process.

Erroneous Learning Countermeasure Configuration Example 2

An application range of learning data using personal identification based on an image is determined so as to prevent erroneous learning.

Next, a configuration in which the application range of learning data using the personal identification based on the image is determined so as to prevent erroneous learning will be described as Erroneous Learning Countermeasure Configuration Example 2.

This process is a process of acquiring an image at a point in time when a user utterance has been executed using the image input unit 104, performing personal identification based on this acquired image, and determining an application range of learning data using the identification result.

In this process, the following processing is executed.

A user, who has executed a learning dialogue by executing a rephrasing utterance in response to an "out-of-domain (OOD) utterance", is recorded in learning data as an application target user for the learning data of the "out-of-domain (OOD) utterance". Furthermore, a user, whose presence during the learning dialogue has been confirmed from an image, is also recorded in the learning data as an application target user.

At the time of later utterance analysis, the application is performed only in a case where an uttering user who has been confirmed from an image is included in the application target users of the learning data.

Since the above-described process is performed, for example, it is possible to perform settings such that data learned as a prank by a child in a situation where a parent is not present is not applied to a later utterance of the parent. Furthermore, there is also an effect that it is possible to perform settings, as another example, such that, when a grandmother who is not familiar with the usage executes an "out-of-domain (OOD) utterance", and then, a father who appears on an image together executes a rephrasing utterance, the grandmother and the father are recorded in learning data as application target users, and the learning data is used to analyze a later utterance of the grandmother.

However, if a user designates a specific person (B) who is present together to permit a learning utterance, thereafter, learning data is recorded to include A as an application target user of the learning data by a learning dialogue performed by B even in a situation where A is not present together.

Specifically, a grandmother (A) who is present together with a father (B) talks to the information processing apparatus 100, "Tell me". Thereafter, learning data based on a learning utterance, which has been executed by the father (B) when the grandmother (A) is not present, is used to analyze an utterance of the grandmother (A).

Since the above process is performed, it is also possible for the father (B) to generate the learning data alone for the grandmother (A).

For example, at is possible to perform processing in which the father (B) executes an utterance that mimics the "out-of-domain (OOD) utterance" of the grandmother (A), and thereafter, executes a rephrasing utterance so as to execute the learning process.

In this manner, (Erroneous Learning Countermeasure Configuration Example 2) is the configuration in which the application range of learning data using the personal identification based on the image is determined so as to prevent the application of erroneous learning data, and information on a learner and the application range is stored for each utterance of the learning data. This is the process similar to a so-called file access right setting process.

5. Regarding Automatic Oblivion Process of Learning Data

Next, an automatic oblivion process of learning data will be described.

In other words, the process of automatically discarding learning data stored in the utterance learning data storage unit 112 will be described.

It is difficult to prevent the entire erroneous learning even if the above (Erroneous Learning Countermeasure Configuration Examples 1 and 2) are used.

Therefore, erroneous learning data is also accumulated in the utterance learning data storage unit 112 in conjunction with correct learning data.

In order to reduce an increase of the accumulation amount of such erroneous learning data, for example, the erroneous learning data is discarded unless continuously used by a person in an application range. In other words, the learning data stored in the utterance learning data storage unit 112 is automatically forgotten according to a pre-defined condition.

This automatic oblivion process of learning data will be described.

The utterance learning adaptive processing unit 108 of the information processing apparatus 100 calculates, for each pieces of the learning data stored in the utterance learning data storage unit 112, a learning data oblivion score f(t, c) according to the following (Formula 1).

$$f(t,c)=(k_c/c)\log(k_t t+1) \qquad \text{(Formula 1)}$$

Note that each parameter has the following meaning in the above (Formula 1).

t: Time (days) elapsed since a user last uttered an utterance corresponding to learning data c: Count of repetitions of an utterance corresponding to learning data executed by a user.

$k_t$: Time weighting factor $k_c$: Repetition count weighting factor

Figure 10:
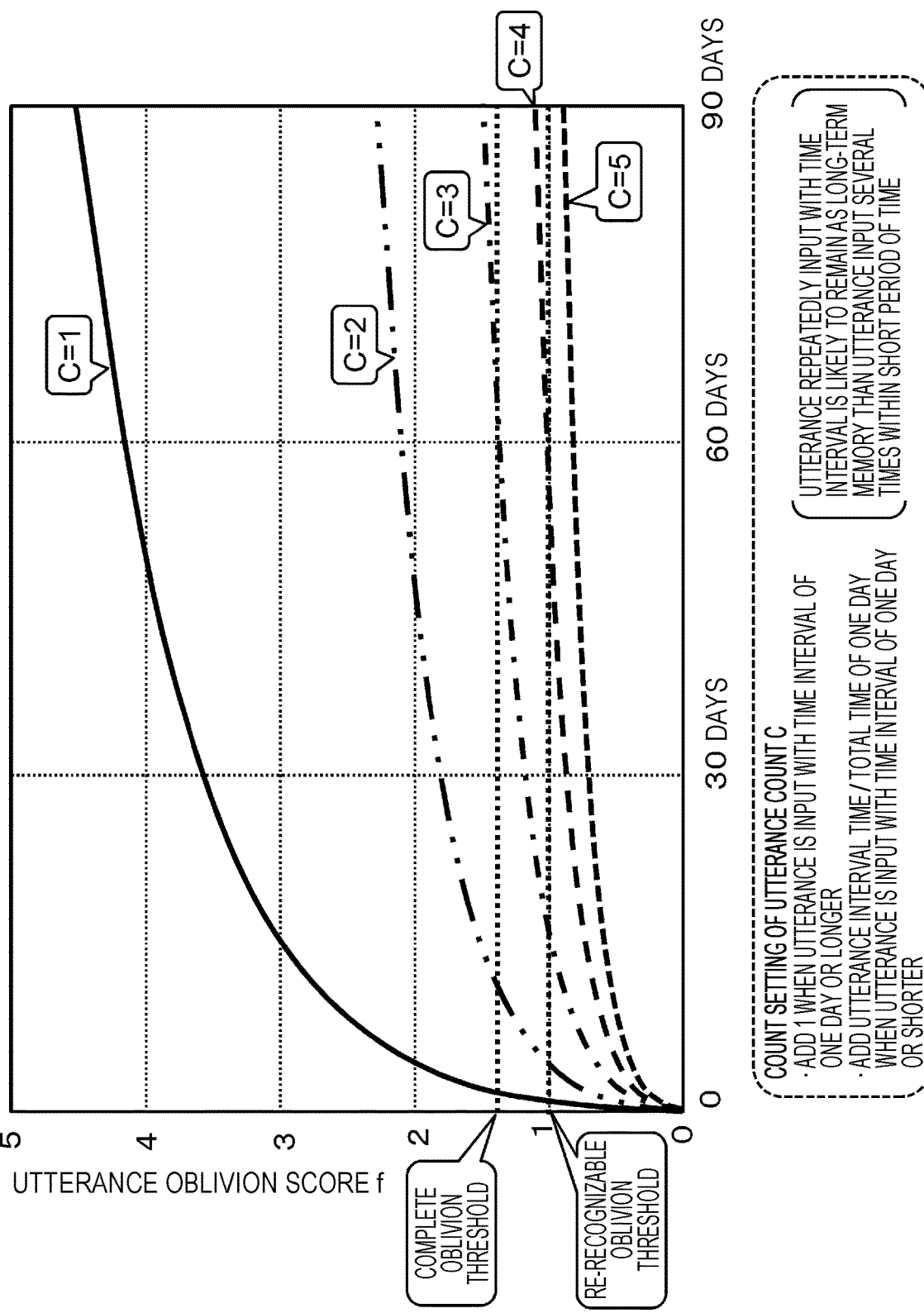
FIG. 10 is a diagram for describing a learning data oblivion score f(t, c).

FIG. 10 illustrates a time transition example of the oblivion score when weighting factors: $k_t$=2 and $k_c$=2.

FIG. 10 illustrates learning data oblivion scores f(t, c) of five examples in which the repetition count of the user's utterance of learning data: c=1, 2, 3, 4, and 5.

The horizontal axis represents a time (t), and the vertical axis represents the learning data oblivion score f(t, c).

The time (t) on the horizontal axis is t in the above definition, and corresponds to t: Time (days) elapsed since the user last uttered the utterance of the learning data.

FIG. 10 illustrates the five examples of the learning data oblivion score f(t, c) when the repetition count of the user's utterance of learning data: c=1, 2, 3, 4, and 5. The oblivion score f(t, c) increases faster as the repetition count is smaller, and an increasing speed of the oblivion score f(t, c) is lowered as the repetition count increases.

Note that a process of updating the parameter c, in other words, c: Repetition count of the utterance of learning data executed by the user is performed according to the following "utterance repetition count c update rule".

The count is updated (+1) in a case where the same utterance is input with a time interval equal to or longer than one day.

In a case where the same utterance is input at a time interval of one day or shorter, (utterance interval interval/total time of a day) is added to a current value of c.

The utterance learning adaptive processing unit 108 of the information processing apparatus 100 performs the process of updating the parameter c in accordance with the above-described "utterance repetition count c update rule".

The above-described process is a process configured to enable an utterance which is repeatedly executed with a time interval to be left as learning data preferentially to an utterance which is repeatedly executed many times in a short time.

The vertical axis in FIG. 10 indicates the following two thresholds:

(1) Re-recognizable oblivion threshold; and
(2) Complete oblivion threshold.

As an example, FIG. 10 illustrates an example with the following setting:

(1) Re-recognizable oblivion threshold=oblivion score f(t, c)=1; and
(2) Complete oblivion threshold=oblivion score f(t, c)=1.4.

Such a threshold setting can adopt various settings.

For example, when an oblivion score f(t, c) of certain learning data stored in the utterance learning data storage unit 112 exceeds the re-recognizable oblivion threshold (1.0 in the example of FIG. 10), the learning data is not applied to a later user utterance analysis process.

Learning data to be applied to the user utterance analysis process is set to only learning data having an oblivion score f(t, c) equal to or less than the re-recognizable oblivion threshold.

However, even in a case where an oblivion score f(t, c) of certain learning data exceeds the re-recognizable oblivion threshold (1.0 in the example of FIG. 10), the learning data is not deleted from the utterance learning data storage unit 112 but is left at this point in time.

Moreover, if arm oblivion score f(t, c) of certain learning data stored in the utterance learning data storage unit 112 exceeds the complete oblivion threshold (1.4 in the example of FIG. 10), the learning data is deleted from the storage unit 112 in other words, the learning data is discarded.

Note that a process of discarding learning data may be configured to be performed during the learning process with respect to the user utterance or during the adaptation process of the learning data, or may be configured to be performed regularly at a set time.

Furthermore, the process may be performed at the start/end of the information processing apparatus 100 or at the start/end of each dialogue state.

Since such a process is performed, for example, erroneous learning and wording that has been used by a user once by change are automatically discarded as unnecessary learning data.

When one piece of the learning data stored in the utterance learning data storage unit 112 has been applied, the utterance learning adaptive processing unit 108 of the information processing apparatus 100 updates date and time information of the learning data to a date and time of adaptation, and updates the utterance repetition count c in a case where an oblivion score of the learning data is lower than the re-recognizable oblivion threshold. The utterance repetition count c is updated according to the above-described "utterance repetition count c update rule".

With such an update process, the oblivion score of the learning data is reset to zero, and the transition is made to a curve according to the newly updated utterance repetition count c.

Since such a process is performed, an oblivion score of a repeatedly spoken utterance hardly increases even if time has passed. In other words, the repeatedly spoken utterance is stored in the utterance learning data storage unit 112 for a long time.

In other words, an utterance stored only once due to erroneous learning or the like is immediately forgotten, but a repeated wording peculiar to the user is stored in the storage unit for a long time.

In a case where learning data of the corresponding utterance already exists at the time of learning and an oblivion score is higher than the re-recognizable oblivion threshold and lower than the complete oblivion threshold (a state where data remains without being discarded although the data corresponds to the "out-of-domain (OOD) utterance" because the data is not to be applied=a re-recognizable state), date and time information of the learning data is updated to a date and time of learning, and the utterance repetition count c is updated according to the above-described "utterance repetition count c update rule".

Learning data whose oblivion score is higher than the re-recognizable oblivion threshold and lower than the complete oblivion threshold is not applied to the user utterance, but is re-recognized by re-learning, and thus, is stored in the utterance learning data storage unit 112 for a longer time than the case before performing the re-learning.

Note that, although the process of performing correction by overwriting the intent (intent) of the learning data stored in the utterance learning data storage unit 112 is performed in the learning process B (correction dialogue flow) executed in step S104 illustrated in FIG. 4, date and time information of learning data is updated to a date and time of correction learning in a case where an oblivion score is lower than the re-recognizable oblivion threshold in the process, and the utterance repetition count c is updated according to the above-described "utterance repetition count c update rule".

Details of the learning process B (correction dialogue flow) executed in step S104 illustrated in FIG. 4 will be described later.

In the process of the present disclosure, the process of updating the parameter c, which is one of constituent parameters of the learning data oblivion score f(t, c), in other words, c: Repetition count of the utterance of learning data executed by the user is performed according to the following "utterance repetition count c update rule".

The count is updated (+1) in a case where the same utterance is input with a time interval equal to or longer than one day.

In a case where the same utterance is input at a time interval of one day or shorter, (utterance interval interval/total time of a day) is added to a current value of c.

The utterance learning adaptive processing unit 108 of the information processing apparatus 100 performs the process of updating the parameter c in accordance with the above-described "utterance repetition count c update rule".

Since such a process of updating the parameter c is applied, the utterance repeated with a time interval is exponentially set as a long-term storage target.

Furthermore, an utterance repeated within a short time (one day or shorter) is discarded early (within several days) since the utterance count c hardly increases.

A plurality of specific examples in which a merit is generated by applying this process of updating the parameter c will be described.

Specific Example 1

Learning data relating to an event-related word, the event occurring once in a year or several years, is stored in the utterance learning data storage unit 112 for a long time.

For example, if "will it be fine on a day of the athletic meet?" and "Has XX won a gold medal today?" are uttered every day for several days, learning data relating to this utterance is stored in the utterance learning data storage unit 112 for a long time.

As a result, the learning data remains in the utterance learning data storage unit 112 even after the lapse of one to several years.

On the other hand, for example, in a case where it is configured to perform automatic discard based on an utterance count in units of several months, learning data is not present in the utterance learning data storage unit 112 after the lapse of one to several years, and thus, a new learning process is required for the same user utterance after the lapse of one to several years.

Note that the likelihood of oblivion may be changed depending on an utterance timing. For example, such processing is performed to make it difficult to forget words including "Christmas" in December.

This processing can be performed, for example, with reference to the knowledge dictionary data stored in the knowledge dictionary data storage unit 111.

Specific Example 2

An utterance of a relative who regularly comes is remembered, and an utterance of a customer having one-time visit is forgotten.

For example, in a case where a user who executes an utterance to the information processing apparatus 100 is a grandmother who comes twice a week and corresponds to the uttering user using the Kansai dialect, the above-described process of updating the parameter c is applied to set the utterance as a long-term storage target in other words, the utterance repeated with the time interval is exponentially set as the long-term memory as described above.

On the other hand, the Kyushu dialect uttered repeatedly within a short time of a friend who seldom comes is forgotten in a few days.

In a case where it is configured to perform the discard process simply based on a frequency, there is a possibility that erroneous interpretation occurs in response to the Kyushu dialect that the main user is not familiar with for several months, but it is possible to reduce the occurrence of such erroneous interpretation by the process of the present disclosure, in other words, with the configuration of preferentially storing the utterance repeated with the time interval as the long-term memory.

Specific Example 3

A one-time fashion word is likely to be discarded.

For example, words relating to one-time news, such as "has a criminal of Shinagawa case been caught?", tends to be uttered repeatedly within a short time, but learning data relating to such an utterance repeated at a short-time interval is unlikely to be set as the long-term storage target in the process of the present disclosure.

In the process of the present disclosure, the learning data relating to such an utterance repeated at a short-time interval is discarded early from the storage unit, and thus, it is possible to prevent the occurrence of erroneous interpretation due to the old utterance and to save memory resources.

Specific Example 4

Erroneous recognition of speech recognition due to environment.

For example, in a case where a sound of a television program tuned by change in a room where the information processing apparatus 100 has been installed has been input and the information processing apparatus 100 has performed a learning process based on input words thereof and stored learning data in the utterance learning data storage unit 112, there is a high possibility that such learning data is discarded early.

On the other hand, learning and application using a user utterance including erroneous recognition of speech recognition under noise environment are regularly repeated for noise generated regularly and constantly in a house, such as noise of a train passing nearby, and learning data under the regular and constant noise environment is stored in the utterance learning data storage unit 112 for a long time.

6. Regarding Details of Learning Dialogue Flow Executed by Utterance Learning Adaptive Processing Unit Next, a description will be given regarding details of the process of generating learning data according to the "learning process B=correction dialogue flow of user utterance intent" executed by the utterance learning adaptive processing unit 108 in step S104 of the flowchart of FIG. 4.

As described above with reference to FIG. 4, the "learning processing B=correction dialogue flow of user utterance intent" in step S104 of the flowchart of FIG. 4 is executed in a case where the information processing apparatus 100 has input an utterance pointing out an intent misinterpretation as a user utterance.

A specific example of the "learning process B=correction dialogue flow of user utterance intent" executed in step S104 will be described with reference to FIG. 11.

Figure 11:
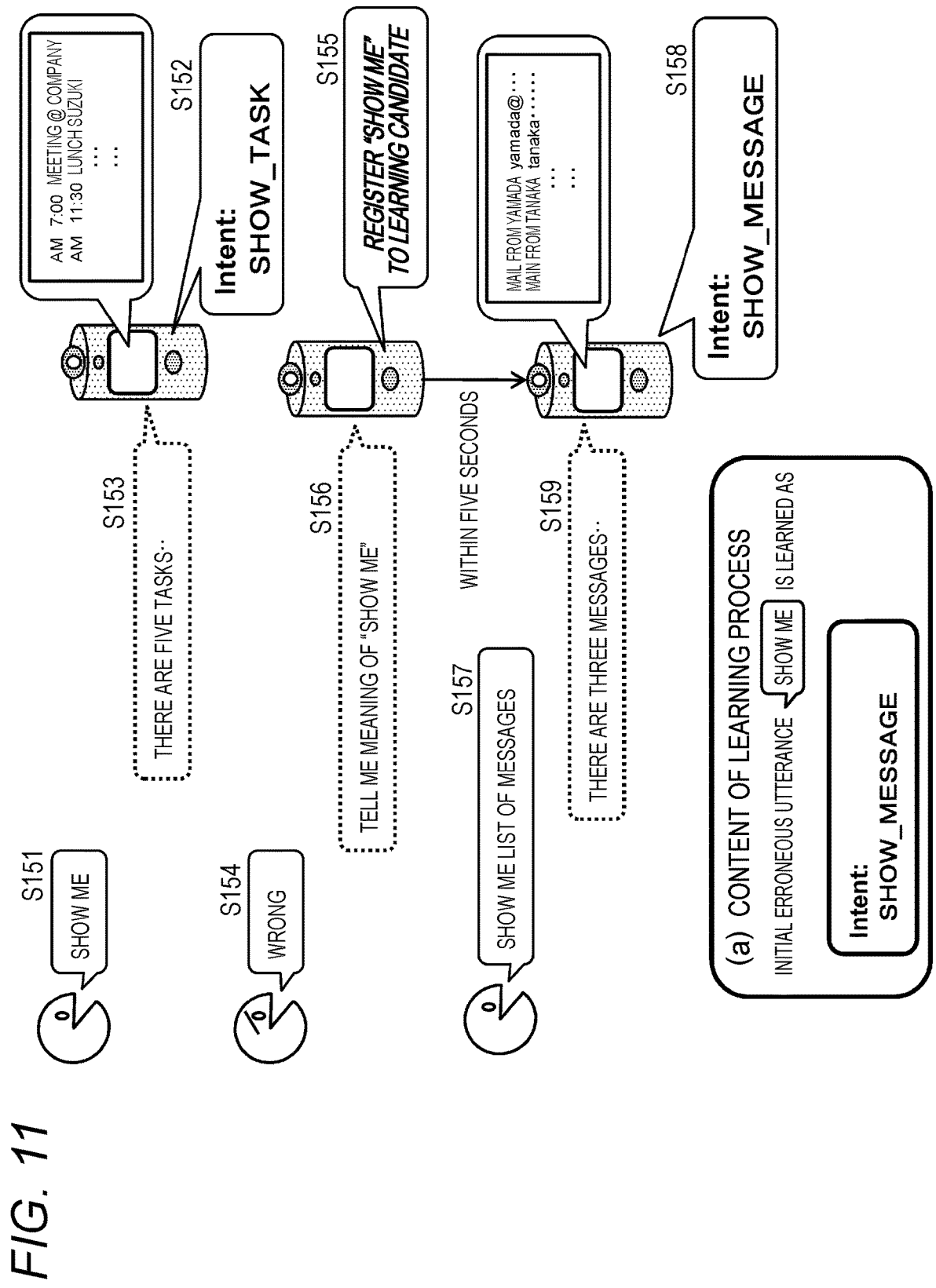
FIG. 11 is a diagram for describing a specific example of a "learning process B=correction dialogue flow of user utterance intent".

The example illustrated in FIG. 11 is an example of the correction dialogue flow in a case where an intent, which has been estimated on the basis of a result of natural language understanding (NLU) executed by the information processing apparatus 100 with an input of a user utterance and learning data, is different from a user utterance intent.

As illustrated in FIG. 11, first, a user has uttered

User utterance="Show me"

with an intent of desiring to view a list of messages in step S151

In step S152, the information processing apparatus 100 performs natural language understanding (NLU) processing and intent estimation based on learning data with an input of the user utterance, and determines that an intent (intent) of the user utterance is "show me tasks (SHOW_TASK)".

Moreover, as processing based on this intent determination result, the following apparatus utterance is executed in step S153 via the speech output unit 123 of the information processing apparatus 100.

Apparatus utterance="There are 5 tasks"

Moreover, a list of the tasks is displayed on the image output unit 125.

The user has uttered "show me" with the intent of desiring to view a list of messages, and thus, utters user utterance="Wrong"

as an utterance pointing out a mistake in step S154.

The utterance learning adaptive processing unit 108 of the information processing apparatus 100 estimates an intent of the user's utterance pointing out the mistake from the natural language understanding (NLU) processing and learning data.

Note that examples of the user's utterance pointing out the mistake include "incorrect", "bad", "say again", "no" and the like in addition to "wrong".

The utterance learning adaptive processing unit 108 recognizes these user utterances as the utterance pointing out the mistake.

When recognizing the user's utterance pointing out the mistake, the utterance learning adaptive processing unit 108 registers the re-processed user utterance "show me" as a learning candidate in step S155. Moreover, an inquiry is made to acquire an utterance intent of the first user utterance="show me" in step S156. In other words, an inquiry sentence regarding a "content of the OOD utterance of the user" for which a mistake has been pointed out is generated by text to speech (TTS).

"Please tell me the meaning of "user's first utterance content"

Then, the above inquiry response is output.

"Please tell me the meaning of "show me""

The information processing apparatus 100 outputs the above inquiry response in step S156 in the example illustrated in FIG. 11.

Note that a TTS utterance word to acquire the user utterance intent may be "please, rephrase", "please say in a different way", or the like.

After the above inquiry utterance to acquire the user utterance intent, a result of the natural language understanding (NLU) (or an application result of learning data) of the user utterance (the user utterance in step S157 in the example of FIG. 11), which has been executed within a pre-defined time (for example, within 5 seconds) is stored as a true utterance intent of "with four of Suzuki".

In other words, the result is stored in the utterance learning data storage unit 112 as the learning data.

However, in a case where there is no user utterance within the pre-defined time (for example, within five seconds) after the execution of the above inquiry in step S156, the learning dialogue flow is ended. In other words, learning data generation is not performed.

In a case where learning data is applied to a process of determining that the intent (intent) of the first user utterance="show me" is "show me tasks (SHOW_TASK)", the learning data is discarded or corrected.

Specifically, in a case where the process of determining the intent (intent) of the first utterance "show me" is "show me tasks (SHOW_TASK)" is the process based on learning data, an intent, which is recorded data of the learning data, is overwritten and corrected.

Furthermore, in a case where the process of determining the intent (intent) of the first utterance "show me" as "show me tasks (SHOW_TASK)" is the process based on the processing result of the natural language understanding (NLU), new learning data is generated and stored.

Note that the learning data is applied preferentially to the natural language understanding (NLU) result at the time of applying the learning data.

"Show me a list of messages"

If the above user response is made in step S157 as the user response with respect to an output, of the process of the information processing apparatus 100 in step S156, in other words, "Please tell me the meaning of "show me""

the above inquiry, the data illustrated in step S158 is stored in the utterance learning data storage unit 112 as learning data in step S158 in FIG. 11.

The data illustrated in step S158 of FIG. 11 is data in which the user utterance intent (intent)="message output (SHOW_MESSAGE)" has been recorded. This data is recorded in the utterance learning data storage unit 112 in association with a user text (utterance words)="show me".

In other words, the utterance learning adaptive processing unit 108 of the information processing apparatus 100 performs the learning process (a) illustrated at the bottom of FIG. 11 by the processes of steps S151 to S158 illustrated in FIG. 11. In other words, learning data indicating that Utterance text (utterance words)="Show me"

is the user utterance having the following intention

Intent (intent)=message output (SHOW_MESSAGE)

is generated and recorded in the utterance learning data storage unit 112.

After this learning process, the utterance learning adaptive processing unit 108 of the information processing apparatus 100 applies the response generation unit 121 or the like in step S159 to execute a process corresponding to the user utterance, in other words, apparatus utterance processing which relates to the message output is executed. In the example illustrated in the drawing, Apparatus utterance="There are three messages" is executed.

In this manner, the utterance learning adaptive processing unit 108 of the information processing apparatus 100 corrects the user utterance intent on the basis of the user's pointing-out.

With the configuration having the above function, the user can correct, for example, revision performed by a user of erroneous learning, and apparatus malfunction due to performance limitations in the speech recognition and the natural language understanding (NLU)

7. Regarding Details of Process of Estimating Intent of User Utterance to which Learning Data has been Applied Next, details of the process to be executed in step S101 of the flow illustrated in FIG. 4, in other words, the process of estimating the intent of the user utterance to which the learning data is applied will be described.

In step S101 in the flow illustrated in FIG. 4, the utterance learning adaptive processing unit 108 acquires a result of natural language understanding (NLU) from text data corresponding to the user utterance, and applies learning data stored in the utterance learning data storage unit 112 to estimate an intent (intent) and entity information (entity) of the user utterance.

Note that the following analysis data for the user utterance is input to the utterance learning adaptive processing unit 108 as described above.

(1) Text data generated on the basis of the user utterance by the speech recognition unit 102;

(2) Intent (intent) and entity information (entity) of the user utterance generated as the utterance semantic analysis unit 103 executes natural language understanding (NLU)) on the text data;

(3) Image recognition result information of the image recognition unit 105 with respect to an image of an uttering user and a periphery of the user acquired by the image input unit 104 such as a camera; and (4) Sensor analysis information analyzed by the sensor information analysis unit on the basis of detection information of states of the uttering user and the periphery of the user acquired by the sensor 106.

The utterance learning adaptive processing unit 108 searches for the text data corresponding to the user utterance whether there is data to which the utterance learning data that has been already stored in the utterance learning data storage unit 112 is applicable.

In a case where the applicable data exists in the utterance learning data that has been already stored in the utterance learning data storage unit 112, the intent (intent) and the entity information (entity) of the user utterance are estimated using the learning data.

On the other hand, in a case where the applicable data does not exist in the utterance learning data that has been already stored in the utterance learning data storage unit 112, the intent (intent) and the entity information (entity) of the user utterance generated as the utterance semantic analysis unit 103 executes the natural language understanding (NLU) on the text data are directly used as the intent and entity information of the user utterance.

Note that the similar processing is performed even in a case where learning data itself does not exist in the initial state.

In the intent estimation process of step S101, the learning data stored in the utterance learning data storage unit 112 is applied.

As described above, the processing such as generation, correction, and discard of the learning data is executed in step S103 and step S104 to be described next.

In other words, the learning data stored in the utterance learning data storage unit 112 is the data sequentially updated by the learning process executed in step S103 and step S104.

The process in step S101 is performed using the latest learning data stored in the utterance learning data storage unit 112.

A description will be given regarding the detailed sequence of the process of estimating the user utterance intent (intent) and the entity information (entity) using the learning data stored in the utterance learning data storage unit 112 with reference to the flowcharts illustrated in FIGS. 12 and 13.

Figure 12:
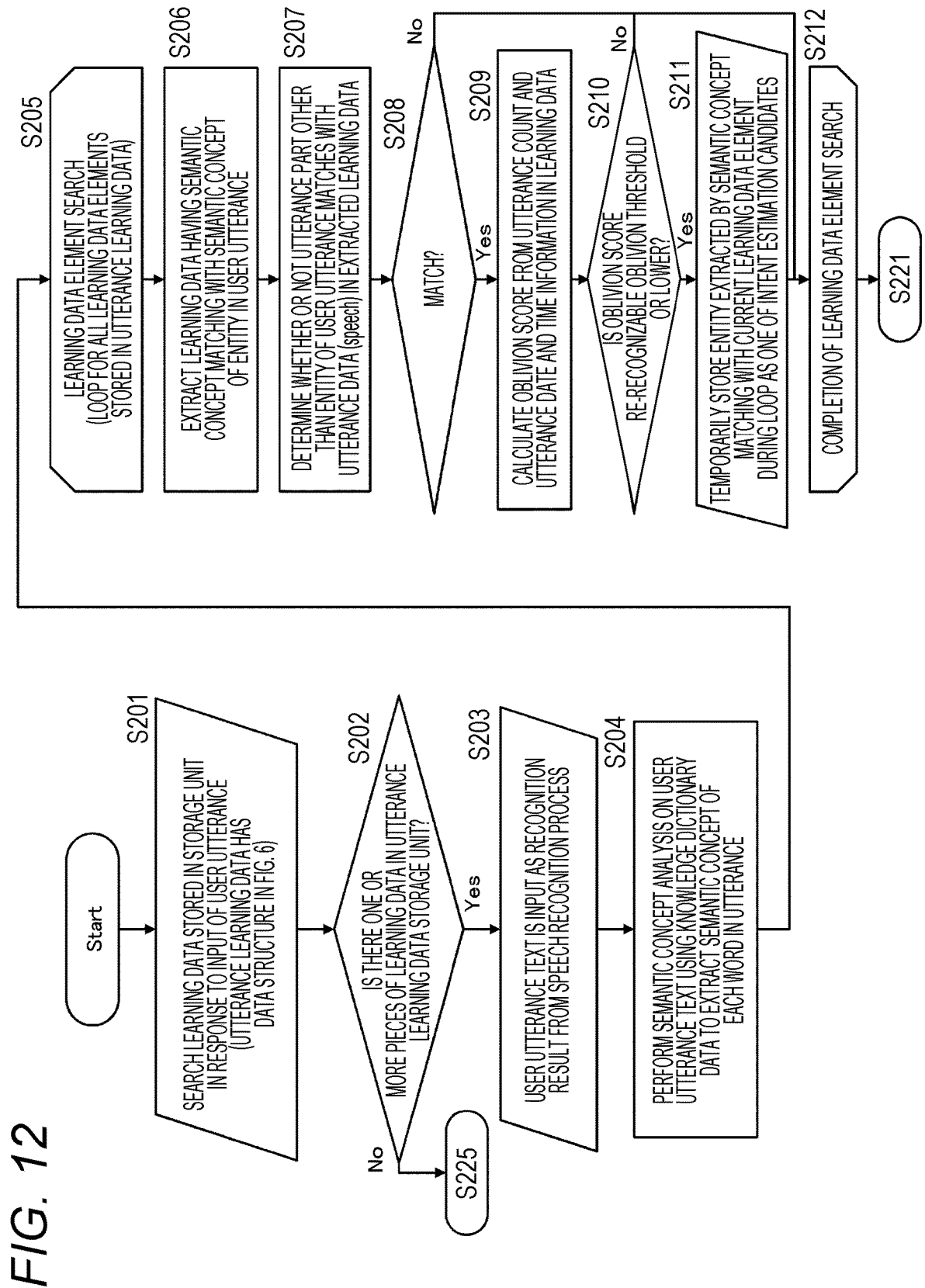
FIG. 12 is a flowchart illustrating a detailed sequence of a process of estimating an intent (intent) of a user utterance and entity information (entity) using learning data.
Figure 13:
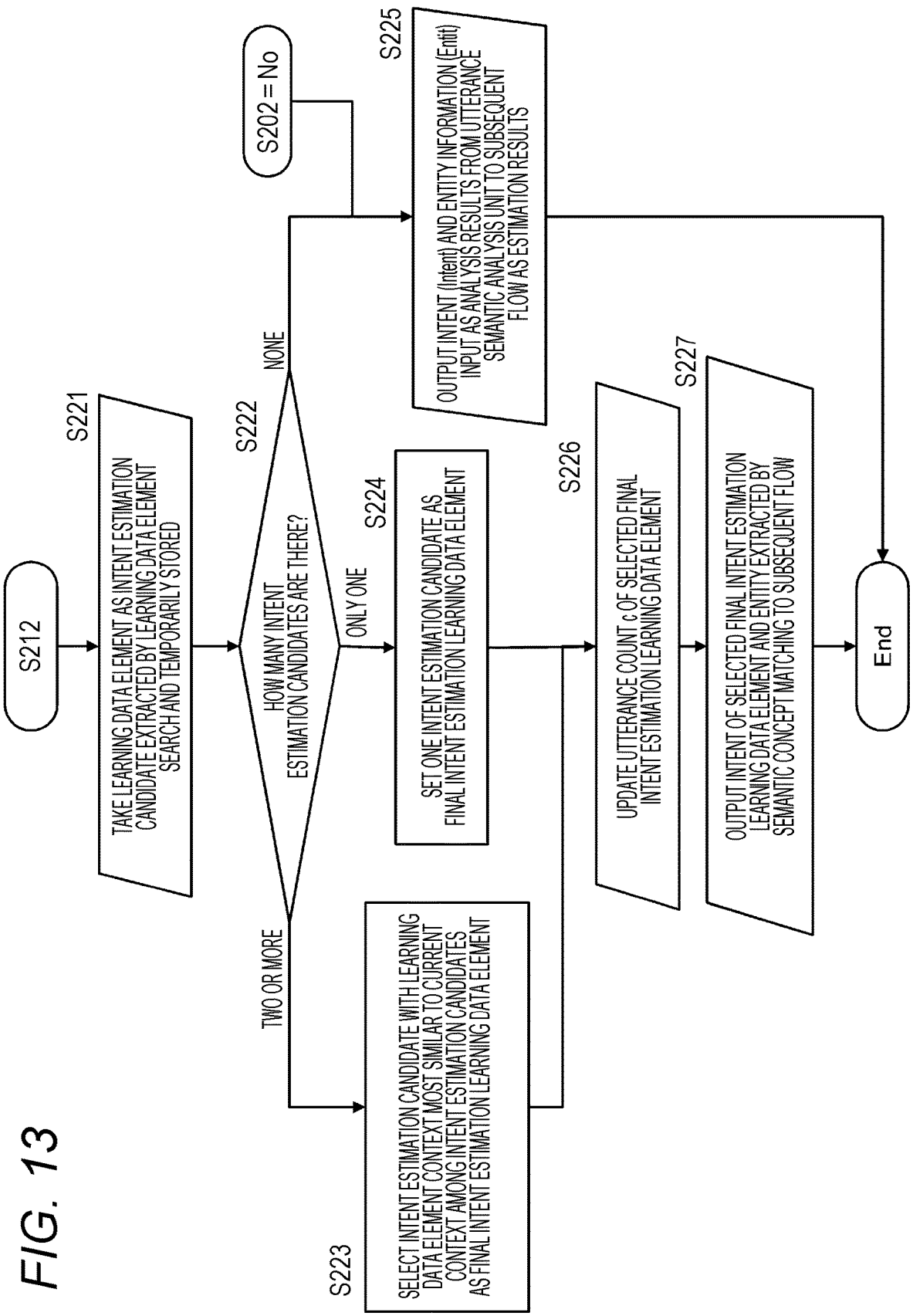
FIG. 13 is a flowchart illustrating a detailed sequence of the process of estimating the user utterance intent (intent) and the entity information (entity) using the learning data.

The processing according to the flowchart illustrated in FIGS. 12 and 13 is executed, for example, according to a program stored in the storage unit of the information processing apparatus 100.

The processing in the utterance learning adaptive processing unit 108 can be executed as program execution processing using a processor such as a CPU having a program execution function, for example.

Hereinafter, a process in each step of the flow illustrated in FIGS. 12 and 13 will be described.

(Step S201)

First, in step S201, the utterance learning adaptive processing unit 108 searches for learning data stored in the storage unit in response to an user utterance input.

In other words, the learning data stored in the utterance learning data storage unit 112 of the information processing apparatus 100 illustrated in FIG. 3 is searched for, Note that each piece of the learning data has the data structure illustrated in FIG. 6.

Note that each piece of the learning data has a different data set for each dialogue state (state) as described above with reference to FIG. 9.

In step S201, a dialogue state (state) at the time of executing the step is analyzed, and the search is performed with learning data corresponding to the dialogue state (state) as a search target.

Since such processing is performed, it is possible to apply learning data adapted to the context of a dialogue, and to reduce a misinterpretation.

(Step S202)

Next, in step S202, the utterance learning adaptive processing unit 108 determines whether or not learning data to be applicable to the user utterance intent estimation is stored in the utterance learning data storage unit 112.

In a case where the learning data applicable to the user utterance intent estimation is not stored in the utterance learning data storage unit 112, the processing proceeds to step S225.

On the other hand, in a case where the learning data applicable to the user utterance intent estimation is stored in the utterance learning data storage unit 112, the processing proceeds to step S203.

(Step S203)

Next, in step S203, the utterance learning adaptive processing unit 108 receives an input of text data generated by the speech recognition unit 102 on the basis of the user utterance.

(Step S204)

Next, in step S204, the utterance learning adaptive processing unit 108 refers to the knowledge dictionary data stored in the knowledge dictionary data storage unit 111 to extract a semantic concept corresponding to entity information (entities) included in the user utterance generated by executing the natural language processing on the text data.

[Semantic concept] is the information which has been described above with reference to FIGS. 7 and 8.

In other words, the semantic concept includes the natural language processing information (nlpInfo) of the entity information (entity) acquired from the user utterance, in other words, the following pieces of information:

(a) Phrase type of clause including entity;

(b) Case of clause including entity (indicating 5W1H such as prime case, time case, and place case, or a modification clause);

(c) Linguistic semantic determination result of clause including entity;

(d) Part-of-speech and type of entity word; and (e) Superordinate semantic concept of entity word.

In step S204 the utterance learning adaptive processing unit 108 extracts the semantic concept corresponding to the entity information (entity) included in the user utterance.

(Steps S205 to S212)

Steps S205 to S212 are loop processes sequentially executed for each piece of the learning data (learning data elements) stored in the utterance learning data storage unit 112.

Note that each piece of the learning data (learning data elements) has the data configuration that has been described above with reference to FIG. 6. In other words, the learning data has the following constituent data.

(1) User utterance text (Speech)
(2) Intent (intent)
(3) Entity information (entity)
(4) attribute information of such values (user utterance date (date) and user utterance count (SpeechCount))

Moreover, the following data is recorded as information regarding one entity as illustrated in FIG. 6(*b*).

The following pieces of information are recorded in each learning data:

(1) User utterance characters of entity (Literal);
(2) Entity type (type);
(3) as natural language processing information (nlpInfo) of entities,
(3a) Phrase type of clause including entity;
(3b) Case of clause including entity (indicating 5W1H such as prime case, time case, and place case, or a modification clause);
(3c) Linguistic semantic determination result of clause including entity;
(3d) Part-of-speech and type of entity word; and
(3e) Superordinate semantic concept of entity word.

In step S206, the utterance learning adaptive processing unit 108 extracts learning data having a semantic concept matching with the semantic concept of the entity in the user utterance.

This process is the process similar to the process that has been described above with reference to FIGS. 8 and 9.

Note that FIG. 9 that has been described above illustrates the case where there is one word whose semantic concept matches with that in the user utterance, but, the number of such words may be two or more. As an example, an user utterance "what is the weather like today in Tokyo?" have two piece of entity information (entities) including "today" and "Tokyo".

Next, in steps S207 to S208, the utterance learning adaptive processing unit 108 determines whether or not an utterance part of the user utterance other than the entities matches with utterance data (speech) of the extracted learning data.

Specifically, this process corresponds to the process of determining the matching of "do" other than the entities of (Kuwahara Keisuke and Hoshino Yuka) of "Do Kuwahara Keisuke" and
"Do Hoshino Yukari"

in the process that has been described above with reference to FIGS. 7 and 8, for example.

In a case where it has been determined that the utterance part other than the entity of the user utterance matches with the utterance data (speech) of the extracted learning data, the processing proceeds to step S209. In a case where the both do not match with each other, the loop processes of the current learning data are ended to transition to the loop processes for the next learning data element.

In a case where it has been determined that the utterance part other than the entity of the user utterance matches with the utterance data (speech) of the extracted learning data, an oblivion score is calculated on the basis of an utterance count and utterance date and time information in the learning data in step S209.

This process corresponds to the process of calculating the learning data oblivion score f(t, c) that has been described above with reference to FIG. 10.

Specifically, the score f(t, c) is calculated according to the following (Formula 1).

$$f(t,c)=(k_c/c)\log(k_t t+1) \quad \text{(Formula 1)}$$

Note that each parameter has the following meaning in the above (Formula 1).

t: Time (days) elapsed since a user last uttered an utterance corresponding to learning data
c: Count of repetitions of an utterance corresponding to learning data executed by a user.
$k_t$: Time weighting factor
$k_c$: Repetition count weighting factor Next, in step S210, the utterance learning adaptive processing unit 108 determines whether or not the calculated oblivion score is the re-recognizable oblivion threshold or lower.

In a case where the oblivion score is the re-recognizable oblivion threshold or lower, the processing proceeds to step S211.

In a case where the oblivion score is not equal to or lower than the re-recognizable oblivion threshold, the loop processes of the current learning data are ended to transition to the loop processes for the next learning data element.

In a case where the oblivion score is the re-recognizable oblivion threshold or lower, the processing proceeds to step S211.

In step S211, the utterance learning adaptive processing unit 108 temporarily stores an entity extracted by matching of the semantic concept with the current learning data element during the loop, as one of intent estimation candidates, in a memory.

When the loop processes of steps S205 to S212 are completed for all the learning data elements, the processing proceeds to the next step S221.

(Step S221)

In step S221, the utterance learning adaptive processing unit 108 extracts, from the memory, learning data elements, serving as the intent estimation candidates which have been extracted by the learning data element search in steps S208 to S212 and temporarily stored.

(Step S222)

In step S222, the utterance learning adaptive processing unit 108 determines the number of the intent estimation candidates that have been acquired from the memory.

In a case where there are two or more candidates, the processing proceeds to step S223.

In a case where there is only a single candidate, the processing proceeds to step S224.

In a case where there is not even one candidate, the processing proceeds to step S225.

(Step S223)

When there are two or more intent estimation candidates acquired from the memory, the utterance learning adaptive processing unit 108 selects an intent estimation candidate whose context information of the learning data element is the most similar to a current context, as a final intent estimation learning data element, among the intent estimation candidates in step S223.

Note that the case where there are two or more intent estimation candidates acquired from the memory occurs, for example, in a case where an entity included to a user utterance is a polysemic word.

In this case, the context analysis that has been described above is performed to select one learning data (element) in which a context similar to a context indicating a situation in which the user utterance has been executed is recorded.

(Step S224)

Furthermore, in a case where there is only a single intent estimation candidate acquired from the memory, the utterance learning adaptive processing unit 108 sets the acquired single intent estimation candidate as the final intent estimation learning data element in step S224.

(Step S225)

Furthermore, in a case where there is not even one intent estimation candidate acquired from the memory, the utterance learning adaptive processing unit 108 outputs the intent (intent) and the entity information (entity), which have been input as the analysis results from the utterance semantic analysis unit 103, to the subsequent flow as estimation results, and ends the processing in step S225.

In other words, the process of step S101 in the flow illustrated in FIG. 4 is ended, and the processing proceeds to step S102.

(Step S226)

On the other hand, when the final intent estimation learning data element has been determined in step S223 or step S224, the processing proceeds to step S226.

In step S226, the utterance learning adaptive processing unit 108 updates the utterance count c of the selected final intent estimation learning data element.

Note that the count parameter c allows the update process to be performed in accordance with the "utterance repetition count c update rule" as described above with reference to FIG. 10.

The count parameter c is the repetition count of the utterance of learning data executed by the user, and the update is performed in accordance with the following "utterance repetition count c update rule".

The count is updated (+1) in a case where the same utterance is input with a time interval equal to or longer than one day.

In a case where the same utterance is input at a time interval of one day or shorter, (utterance interval interval/ total time of a day) is added to a current value of c.

In this manner, the utterance learning adaptive processing unit 108 performs the process of updating the parameter c in accordance with the above-described "utterance repetition count c update rule".

Furthermore, in step S226, user utterance date and time information of the selected final intent estimation learning data element may be updated to a date and time of adaptation when this step is being executed.

(Step S227)

Next, in step S227, the utterance learning adaptive processing unit 108 outputs an intent (intent) of the selected final intent estimation learning data element and entity (entity), extracted by the semantic concept match to the subsequent flow and ends the processing.

In other words, the process of step S101 in the flow illustrated in FIG. 4 is ended, and the processing proceeds to step S102.

8. Regarding Other Embodiments

Next, other embodiments will be described.

The following embodiments will be described.

(a) Configuration to perform generation of learning data of general-purpose natural language understanding (NLU)

(b) Configuration to perform utterance learning by rephrasing from a user (c) Configuration to present contents of a learning process to a user (d) Other modifications Hereinafter, these embodiments will be sequentially described.

(a) Configuration to Perform Generation of Learning Data of General-Purpose Natural Language Understanding (NLU)

A large number of the information processing apparatuses 100 are connected to a server via a network.

The server collects learning data executed in each of the information processing apparatuses 100, and analyzes correspondence data between utterance words, and an intent (intent) and entity information (entity).

The server can perform division setting of learning data corresponding to attribute classifications, for example, by classifying learning data for each attribute classification such as an area and an age. Furthermore, these classified pieces of learning data may be accumulated and used as learning data of a general-purpose NLU engine.

(b) Configuration to Perform Utterance Learning by Rephrasing from a User

Next, a configuration example in which utterance learning is performed by rephrasing from a user will be described.

Figure 14:
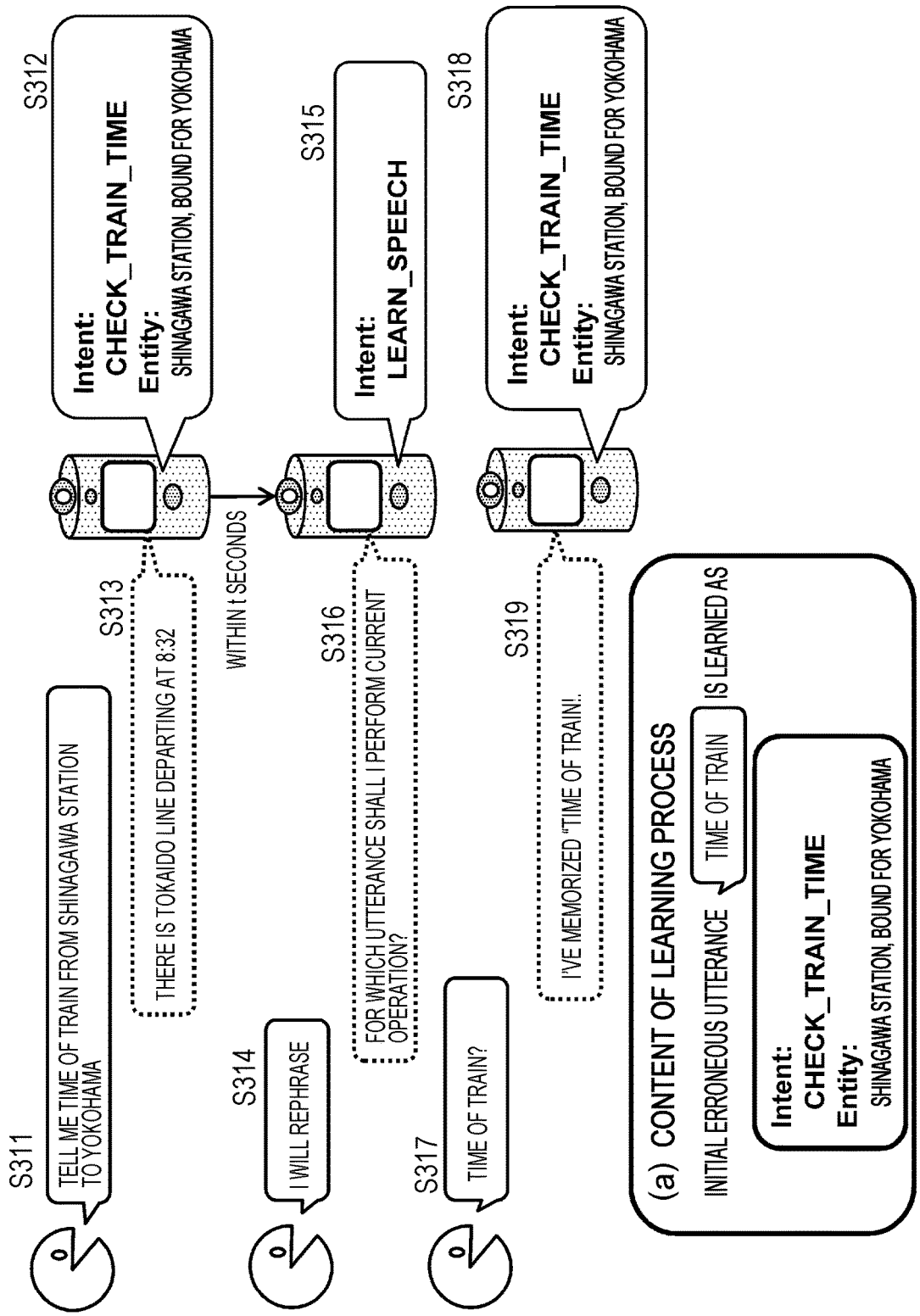
FIG. 14 is a diagram for describing an example of utterance learning flow based on rephrasing from a user.

FIG. 14 illustrates an example of utterance learning flow based on the rephrasing from the user.

As illustrated in FIG. 14, the user first executes the following utterance in step S311.

User utterance="Tell me the time of the train from Shinagawa station to Yokohama"

In step S312, the information processing apparatus 100 acquires, as results of natural language understanding (NLU) for the user utterance, the following.

User utterance intent (intent)=train time check (CHECK_TRAIN_TIME)

Entity information of user utterance (entity)=Shinagawa station, bound for Yokohama In step S313, the information processing apparatus 100 outputs an apparatus utterance on the basis of the analysis result.

Apparatus utterance="There is a Tokaido line departing at 8:32"

Then, the user utters the following utterance to give an instruction for rephrasing within a defined time t (for example, five seconds) from the apparatus utterance output in step S314.

User utterance="Rephrase"

If the rephrase instruction from the user is input within the defined time (for example, five seconds) from the apparatus utterance output, the information processing apparatus 100 acquires the following result of natural language understanding (NLU) for the user utterance in step S315.

Intent (intent)=utterance learning (LEARN_SPEECH)

Moreover, a question to ask for a specific utterance of rephrased words is made in step S316. In other words, "for which utterance shall I perform the current operation?"

the above apparatus utterance is executed.

Then, the user executes the following rephrasing utterance in step S317.

User utterance="Time of train"

The utterance learning adaptive processing unit 108 of the information processing apparatus 100 that has received such an input of the user utterance generates learning data in which Intent (intent)=train time check (CHECK_TRAIN_TIME); and Entity information of user utterance (entity)=Shinagawa station, bound for Yokohama have been recorded for the user utterance text (speech)="time of train" and stores the generated learning data in the utterance learning data storage unit 112.

After such generation and storage of learning data, it is determined that the user utterance="time of train" is an utterance including the following intent (intent) and entity information (entity)

Intent (intent)=train time check (CHECK_TRAIN_TIME),

Entity information of user utterance (entity)=Shinagawa station, bound for Yokohama, with reference to the registered learning data in a case where the user utterance="time of train" is executed.

When there is an utterance repeatedly (regularly) executed by the user with respect to the system (the information processing apparatus 100), it becomes troublesome to say all the same contents each time in such a case, the user makes the system memorize shorter and simpler utterance words, whereby it is possible to make the user hardly feel troublesome due to the repeated utterance.

Moreover, another example of the example of performing the utterance learning by the rephrasing from the user will be described with reference to FIG. 15.

Figure 15:
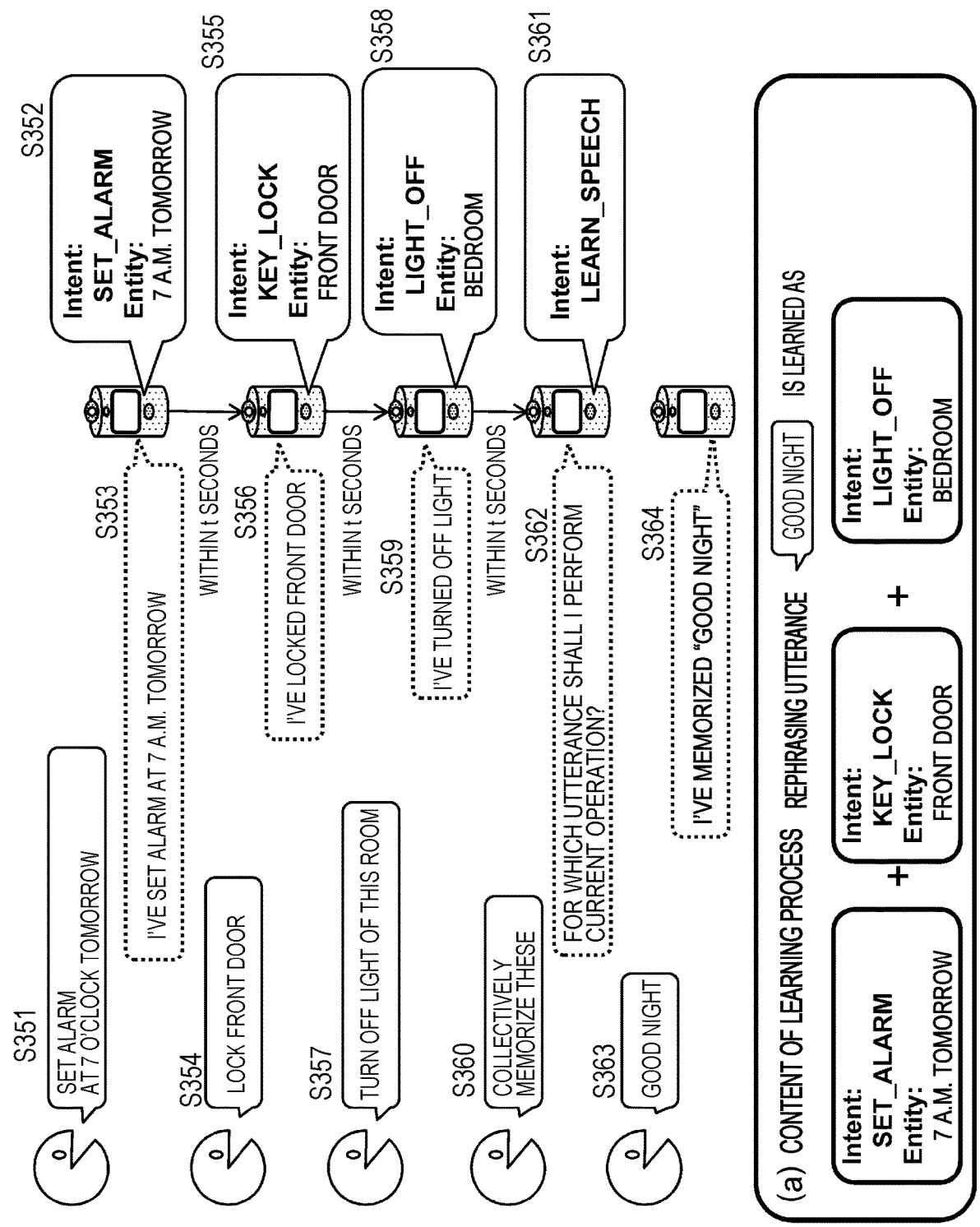
FIG. 15 is a diagram for describing an example of performing utterance learning based on rephrasing from a user.

As illustrated in FIG. 15, the user first executes the following utterance in step S351.

User utterance="Set the alarm at 7 o'clock tomorrow"

In step S352, the utterance learning adaptive processing unit 108 of the information processing apparatus 100 acquires, as results of natural language understanding (NLU) for the user utterance, the following.

User utterance intent (intent)=alarm set (ALERM_SET)

Entity information of user utterance (entity)=7 a.m. tomorrow

Moreover, the utterance learning adaptive processing unit 108 of the information processing apparatus 100 executes the following response utterance in step S353.

Apparatus utterance="I've set the alarm at 7 a.m. tomorrow"

Next, the user executes the following utterance in step S354 within a prescribed time (t seconds) from the apparatus response in step S353.

User utterance="Lock the front door"

In step S355, the utterance learning adaptive processing unit 108 of the information processing apparatus 100 acquires, as results of natural language understanding (NLU) for the user utterance, the following.

User utterance intent (intent)=key lock (KEY_LOCK)

Entity information of user utterance (entity)=front door

Moreover, the utterance learning adaptive processing unit 108 of the information processing apparatus 100 executes the following response utterance in step S356.

Apparatus utterance="I've locked the front door"

Next, the user executes the following utterance in step S357 within a prescribed time (t seconds) from the apparatus response in step S356.

User utterance="Turn off the light of this room"

In step S358, the utterance learning adaptive processing unit 108 of the information processing apparatus 100 acquires, as results of natural language understanding (NLU) for the user utterance, the following.

User utterance intent (intent)=light off (LIGHT_OFF)

Entity information of user utterance (entity)=bedroom

Moreover, the utterance learning adaptive processing unit 108 of the information processing apparatus 100 executes the following response utterance in step S359.

Apparatus utterance="I've turned off the light"

Next, the user executes the following utterance in step S360 within a prescribed time (t seconds) from the apparatus response in step S359.

User utterance="Collectively memorize these"

In step S361, the utterance learning adaptive processing unit 108 of the information processing apparatus 100 acquires, as results of natural language understanding (NLU) for the user utterance, the following.

User utterance intent (intent)=utterance learning (LEARN_SPEECH)

Moreover, a question to ask for a specific utterance of rephrased words is made in step S362. In other words, Apparatus utterance="For which utterance shall I perform the current operation?"

the above apparatus utterance is executed.

Then, the user executes the following rephrasing utterance in step S363.

User utterance="Good night"

The utterance learning adaptive processing unit 108 of the information processing apparatus 100 having received such an input of the user utterance generates learning data having the following three intents (intents) and entity information (entities) as learning data associated with User utterance="Good night"

and stores the generated learning data in the storage unit.

In other words, as illustrated in the lower part of FIG. 15, the learning data in which the following three intents (intents) and entity information (entities) are associated with the user utterance="good night" is generated.

(1a) Intent of user utterance (intent)=Alarm set (ALERM_ SET), (1b) Entity information of user utterance (entity)=7 a.m. tomorrow (2a) Intent of user utterance (intent)=Key lock (KEY_LOCK).

(2b) Entity informatics of user utterance (entity)=Front door, (3a) Intent of user utterance (intent)=Light off (LIGHT_OFF), and (3b) Entity information of user utterance (entity)=Bedroom, Then, learning data in which three intents (intents) and entity information (entities) are associated with User utterance="Good night" is generated and the generated learning data is stored in the storage unit, in other words, the utterance learning data storage unit 112.

Finally, the utterance learning adaptive processing unit 108 of the information processing apparatus 100 executes the following processing completion utterance in step S364.

Apparatus utterance="I've memorized "good night""

After this learning, the three functions learned for "good night" are collectively executed.

A plurality of functions can be collectively executed with the short and simple utterance as a macro, which improves convenience.

(c) Configuration to Present Contents of a Learning Process to a User

Next, a configuration example to present contents of the learning process to the user will be described.

There are various modes of the learning process to be executed by the information processing apparatus 100, and there is a case where the user desires to confirm what kind of learning process has been executed by the information processing apparatus and what kind of learning data has been generated.

According to such a user's request, a display to explicitly deliver what has been learned (done) to the user during learning is executed via the image output unit 125 of the information processing apparatus 100.

Figure 17:
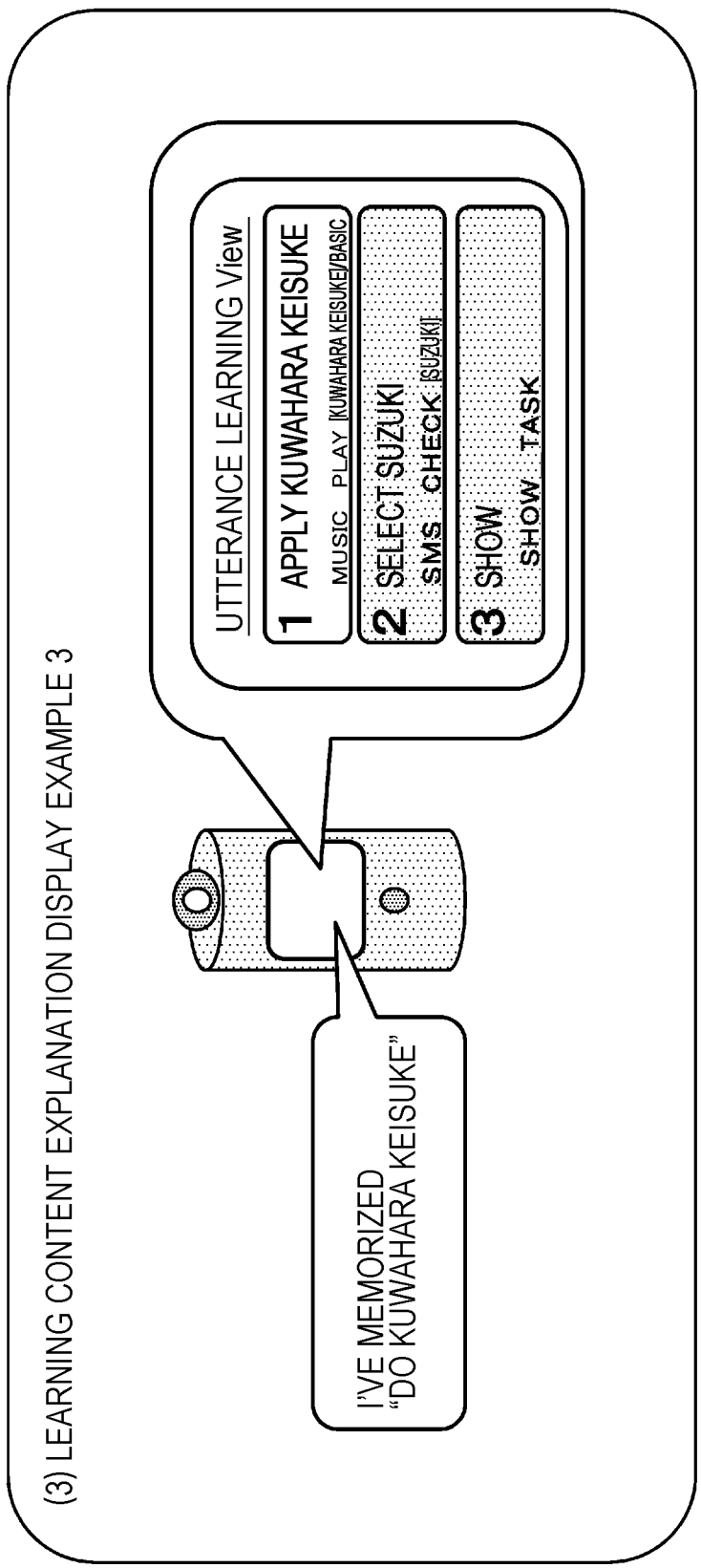
FIG. 17 is a diagram for describing a display example to explicitly deliver what has been learned (is being learned) to a user during learning.

Specific examples of display data will be described with reference to FIGS. 16 and 17.

Learning Content Explanation Display Example 1 Illustrated in FIG. 16(1)

Learning Content Explanation Display Example 1 is a learning content explanation display example in any case of a case in which a user utterance as the out-of-domain (OOD) utterance and the learning dialogue flow of the user utterance intent in step S103 illustrated in. FIG. 4 is executed or a case in which a user utterance is the utterance pointing out an intent misinterpretation and the correction dialogue flow of the user utterance intent in step S104 illustrated in FIG. 4 as executed.

Specifically, this example is a screen display example when the user is asked of a true utterance intent by the system (the information processing apparatus 100) during these processes.

In this case,

Content of user's utterance as out-of-domain (OOD) utterance

"Read Suzuki's"

is displayed on the image output unit 125, and an icon "?" indicating that the utterance is a learning candidate is displayed.

Since such a display is performed, the user can understand any utterance that the system (the information processing apparatus 100) intends to learn.

Learning Content Explanation Display Example 2 Illustrated in FIG. 16(2)

Learning Content Explanation. Display Example 2 is a display example in a case where there has been the utterance of the rephrasing instruction from the user which has been described above with reference to FIGS. 14 and 15, for example.

This examples corresponds to a screen display example when the user is asked of the rephrased words by the system (the information processing apparatus 100).

In this case, (a plurality of) utterance contents to be rephrased and an intent (intent) and entity information (entity) thereof are explicitly illustrated on the image output unit 125.

Moreover, a number (an icon) indicating an execution order is explicitly illustrated.

With this display, the user can confirm what are to be collectively executed, and thus, easily speaks rephrased words.

Learning Content Explanation Display Example 3 illustrated in FIG. 17(3) is a display example in the case of storing learning data in the utterance learning data storage unit 112 in a case where the learning dialogue flow of the user utterance intent in step S103 illustrated in FIG. 4, for example, is executed or in a case where there has been the utterance of the rephrasing instruction from the user which has been described with reference to FIGS. 14 and 15.

In this case, utterance words of learned data and an intent (intent) and entity information (entity) thereof are displayed on the image output unit 125.

Note that, in such a display process, it is preferable to highlight data that has been currently learned with respect to already-learned data by differentiating brightness or a font, or performing animation display or the like.

Since such a display process is executed, the user can confirm the utterance word and the function thereof for which the system (the information processing apparatus 100) has stored the learning data in the utterance learning data storage unit 112, and such an utterance word is available after then.

(d) Other Modifications

Next, other modification will be described.

The utterance learning adaptive processing unit 108 of the information processing apparatus 100 of the present disclosure described above may be configured to further perform the following processes.

(d1) Modification 1

In a case where a plurality of intents has been acquired as a result of natural language understanding (NLU) of a user utterance, the system (the information processing apparatus 100) may ask a user which intent out of the plurality of intents is the user's true utterance intent and learn an answer thereof as an intent of a first user utterance.

For example, in a case where two intents (intents) of [SHOW_TASK] and [SHOW_MESSAGE] have been acquired as results of natural language understanding (NLU) for the user's utterance "show me" as in the sequence of FIG. 11 which has been described above, the following process is performed.

The system (the information processing apparatus 100) executes a question utterance "which one do you want to view, a task list or a message list?"

to the user, and learns the first user utterance "show me" as

Intent (intent)=SHOW_MESSAGE if there is an answer such as

"Show me a message".

On the other hand, if the user utterance is an answer such as "show me a task", the system learns the first user utterance as Intent (intent)=SHOW_TASK.

(d2) Modification 2

In a case where a reliability score of an intent that has been acquired as a result of natural language understanding (121) of a user utterance is low, the system (the information processing apparatus 100) may ask a user if the intent with the low reliability score is the user's true utterance intent and learn an answer thereof as an intent of a first user utterance.

For example, in a case where a reliability score of the following pieces of data, which are the natural language understanding (NLU) results:

Intent (intent)=music play (PLAY_MUSIC); and

Entity information (entity)=Kuwahara Keisuke, is lower than the pre-defined threshold for the user's utterance such as "Do Kuwahara Keisuke"

as described above with reference to FIG. 7, the system (the information processing apparatus 100) executes a question utterance such as "May I play the music of Kuwahara Keisuke?"

to the user before executing a function (playing music).

In response to this question, if the user gives an answer such as "yes", the first user utterance, "Kuwahara Keisuke" is learned as Intent (intent)=music play (PLAY_MUSIC), and Entity information (entity)=Kuwahara Keisuke.

On the other hand, if the answer from the user is "no", the system (the information processing apparatus 100) asks a question, "Please tell me the meaning of "do Kuwahara Keisuke"", and the process that has been described with reference to FIG. 7 is executed.

(d3) Modification 3

The system may enter a mode (non-learning mode) in which learning is not performed is accordance with an utterance instruction from a user.

For example, when the user utters "don't memorize what I said", the system enters the non-learning mode and does not perform generation and correction of learning data thereafter.

In this non-learning mode, an utterance from the system (the information processing apparatus 100) such as "please tell me the meaning of XX" is executed for the user's "out-of-domain (OOD) utterance" or utterance pointing out a mistake so that the user's true utterance intent is acquired and the function is executed.

However, the learning data is not stored in the utterance learning data storage unit 112.

Furthermore, if the user utters "memorize what I said", the non-learning mode is canceled, and thereafter, the normal learning process is performed.

This configuration is advantageous, for example, in terms of not storing data relating to privacy of the uttering user in the storage unit.

(d4) Modification 4

It may be configured such that learning is performed including a use situation of an external cooperation device at the time of learning a certain user utterance, and a use situation of the external cooperation device is also acquired even at the time of analyzing an intent of a new user utterance to be compared with the use situation of the external cooperation device recorded in learning data so as to apply the learning data having data with the same use situation.

When it is configured to record the device use situation in the learning data of the user utterance in this manner, the following process can be performed.

For example,

Intent (intent)=Television power ON (POWERON_TV) of a user utterance "turn on", learned when the television is turned off, is not applied to a user utterance "turn on" when the television is turned on.

The intent is only applied to the user utterance "turn on" when the television is turned off.

Such a process becomes possible.

Furthermore, an intent (intent) of a user utterance, learned during usage (work) of a work PC is not applied when the work PC is not used (private time).

With such setting, it is possible to perform the optimal process (function execution) in accordance with the use situation of the external cooperation device.

(d5) Modification 5

A user's situation at the time of learning is recognized from information such as an image and a sensor, and learning is performed by acquiring a true intent when the user has spare time.

In a case where user's motion is large, or a situation where the user is about to leave the room in a hurry, the system (the information processing apparatus 100) executes a response as "I do not understand" for the user's "out-of-domain (OOD) utterance", for example, "show me".

On the other hand, the system (the information processing apparatus 100) executes the following utterance in order to acquire the true intent when the user is relaxing in the room (has spare time without being in hurry).

"Please tell me the meaning of "show me" that you said in the morning"

Learning is performed by inputting a user utterance based on such a question utterance.

When such learning is performed in accordance with the situation, it is possible to perform the learning based on the dialogue with the user only when the user has spare time.

9. Regarding State Transition and Effects of Processing of Information Processing Apparatus of Present Disclosure Next, a description will be given regarding state transition and effects of the processing of the information processing apparatus of the present disclosure.

Figure 18:
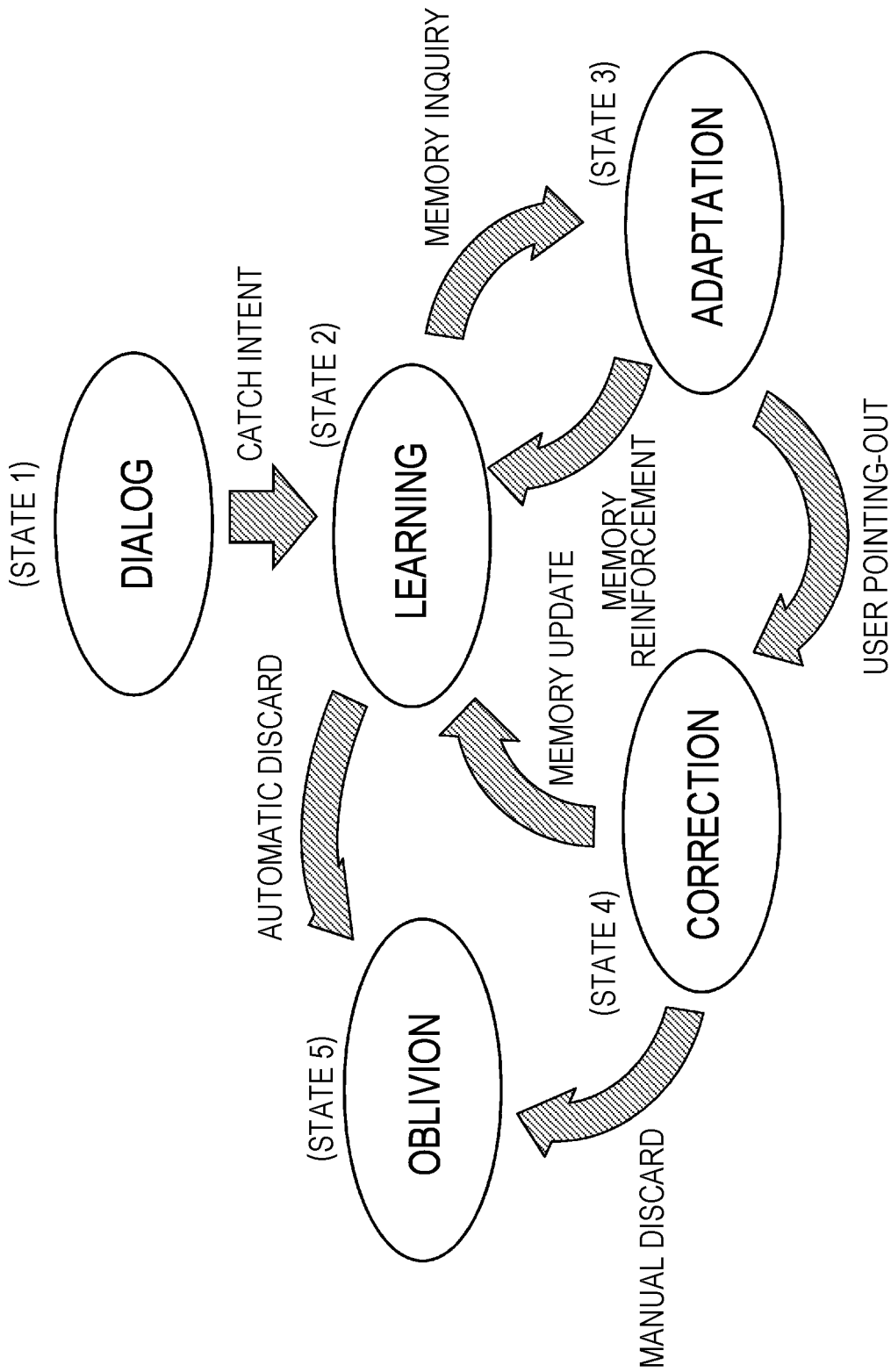
FIG. 18 is a diagram for describing state transition of the information processing apparatus of the present disclosure.

FIG. 18 is a diagram for describing a concept of state transition of the information processing apparatus 100 of the present disclosure, which focuses on life cycle processing of learning data for individual user utterances.

As illustrated in FIG. 18, the information processing apparatus 100 of the present disclosure has the following five states, and transitions between the respective states in accordance with a process to be executed.

State 1=Dialogue state
State 2=Learning state
State 3=Adaptation state
State 4=Correction state
State 5=Oblivion state These states correspond to states of the utterance learning adaptive processing unit 108 of the information processing apparatus 100, and transition is made between the respective states in accordance with the process executed by the utterance learning adaptive processing unit 108.

State 1=dialogue state is a state where the information processing apparatus 100 is conducting a dialogue with the user.

When the information processing apparatus 100 acquires a user intent (intent) through a dialogue, the state transitions to State 2=Learning state.

In State 2=learning state, state transition is made with respect to State 3=adaptation state in accordance with the process.

When a new user utterance is input, the state transitions to State 3=adaptation state by performing a memory inquiry in order to use the learning data stored in the utterance learning data storage unit 112.

When the learning data is applied to the new user utterance in State 3=adaptation state, memory reinforcement is performed to update user utterance count information in the learning data and set the learning data as the long-term memory.

Furthermore, in State 2=learning state, the discard determination process of the learning data based on the learning data oblivion score f(t, c), which has been described above with reference to FIG. 10, is appropriately performed. When it is determined as the automatic discard, the state transitions to State 5=oblivion state, and the learning data is discarded.

State 5=Oblivion state

Note that the utterance learning adaptive processing unit 108 calculates, for each pieces of the learning data stored in the utterance learning data storage unit 112, a learning data oblivion score f(t, c) according to the following (Formula 1) as described above with reference to FIG. 10.

$$f(t,c) = (k_c/c)\log(k_t t+1) \qquad \text{(Formula 1)}$$

Such a calculated value is compared with the complete oblivion threshold, and whether to discard the learning data is determined on the basis of the comparison result.

State 4=correction state corresponds to, for example, the execution state of the process of step S104 in the flow illustrated in FIG. 4.

In other words, State 4 is a state where the correction process of the learning data, executed according to the sequence illustrated in FIG. 11, is performed.

With this process, the correction and discard of the learning data stored in the utterance learning data storage unit 112 are performed.

For example, when five seconds or longer have passed after the input of the user utterance "wrong" in step S154 during the process of step S104 in the flow of FIG. 4, specifically, the process that has been described with reference to FIG. 11, the information processing apparatus 100 deletes the learning data pointed out to be wrong from the storage unit.

For example, this process corresponds to transition (user pointing-out) from State 3=adaptation state to State 4=correction state illustrated in FIG. 18 and transition (manual discard) from State 4=correction state to State 5=oblivion state.

Furthermore, when the learning data is updated to correct learning data using a new user utterance, transition is made from State 4=correction state to State 2=learning state, and storage (memory update) of the correct learning data is executed in the storage unit.

In this manner, the information processing apparatus 100 of the present disclosure has the plurality of different states, and transitions between the respective states in accordance with the process to be executed.

As the information processing apparatus 100 receives inputs of various user utterances and executes dialogues with the user, the state transition illustrated in FIG. 18 is continuously executed. As a result, the learning data stored in the utterance learning data storage unit 112 is optimized such that it is possible to grasp accurate intent of the user utterance.

Examples of effects of the processes to be executed by the information processing apparatus 100 of the present disclosure include the following effects.

(1) Since the system (the information processing apparatus 100) performs learning and adaptation of the user-specific wording and the intent thereof during use, the user can perform speech input using various natural utterances that is not covered by the conventional NLU engine which learns utterances in a general purpose.

(2) The user can talk to the system (the information processing apparatus 100) using natural utterances as if talking to a person, and thus, a load of the speech input is reduced, and the speech dialogue system (the information processing apparatus 100) can be used continuously.

(3) The system (the information processing apparatus 100) learns utterances as being used more and more, and the number of unique expressions that be interpreted by the system increases. Thus, the user can get such feeling that the system is growing up suitably for the user, which leads to the improvement in use frequency and long-term use.

(4) The system (the information processing apparatus 100) can automatically discard the utterance learning data that the user does not use regularly (including the erroneous learning data) and also correct and discard the learning data on the basis of the user utterance, and thus, it is possible to reduce the malfunction, different from the user utterance intent, of the system (the information processing apparatus 100).

(5) Since the utterance learning data which is not expected to be used is automatically discarded, it is possible to suppress consumption of system resources due to retention of unnecessary data.

(6) Since the personalized learning data is used as the learning data of the general-purpose natural language understanding (NLU) engine, it becomes possible to efficiently and automatically collect learning data of utterances being frequently used at the time (wording of fashion well-established to certain extent).

10. Regarding Configuration Examples of Information Processing Apparatus and Information Processing System Although the plurality of embodiments has been described, the various processing functions described in these embodiments, for example, all the processing functions of the respective constituent elements of the information processing apparatus 100 illustrated in FIG. 3 can be also configured within one apparatus, for example, an agent device owned by a user, or an apparatus such as a smartphone and a PC, and some of the functions can be also configured to be executed in a server or the like.

Figure 19:
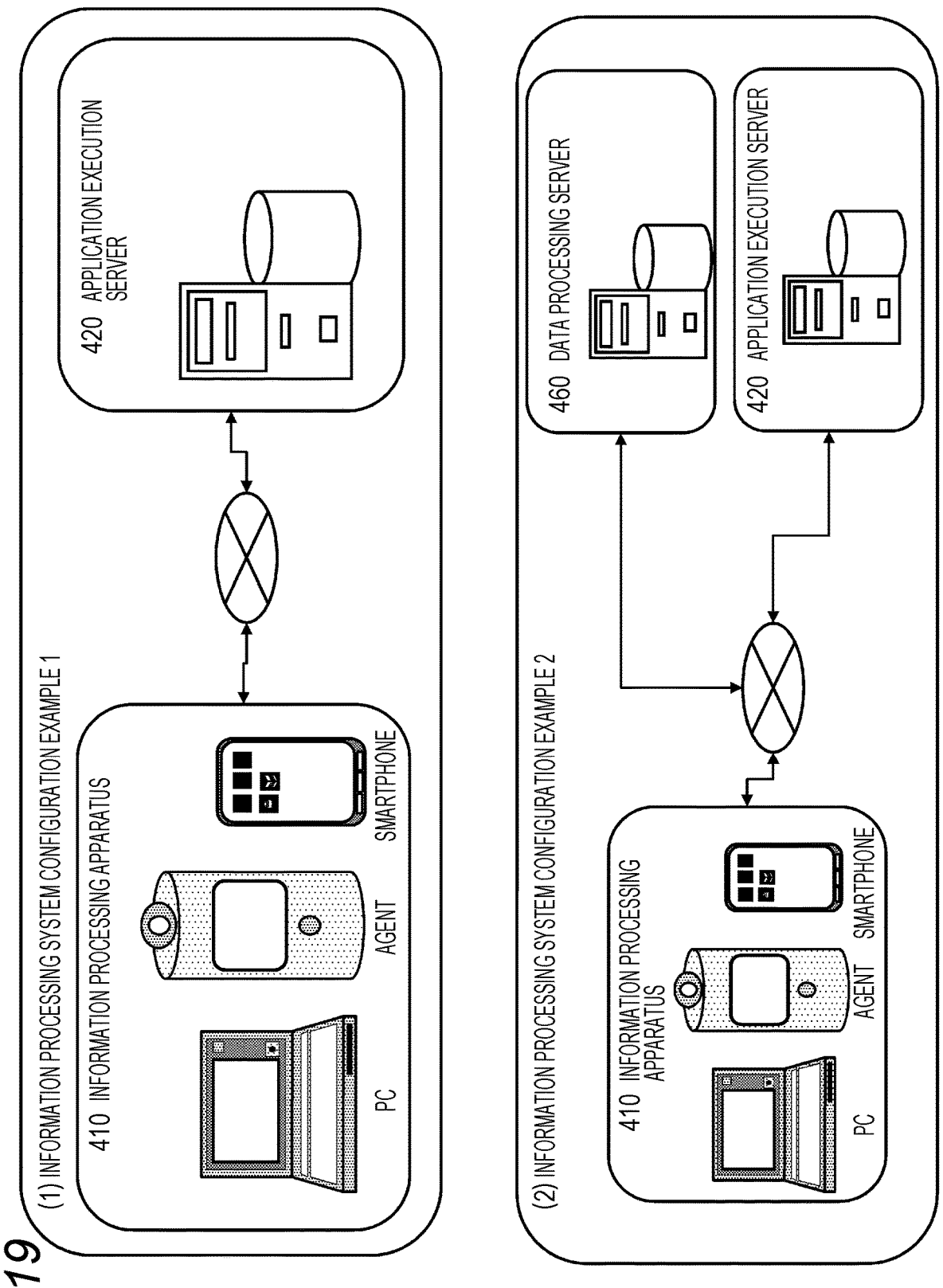
FIG. 19 is a diagram for describing a configuration example of an information processing system.

FIG. 19 illustrates a system configuration example.

Information processing system configuration example 1 in FIG. 19(1) is an example in which almost all the functions of the information processing apparatus illustrated in FIG. 3 are configured within one apparatus, for example, an information processing apparatus 410 which is a user terminal such as a smartphone or a PC owned by a user and an agent device having speech input/output and image input/output functions.

The information processing apparatus 410 corresponding to the user terminal executes communication with an application execution server 420 only in the case of using, for example, an external application at the time of generating a response sentence.

The application execution server 420 is, for example, a weather information providing server, a traffic information providing server, a medical information providing server, a sightseeing information providing server, or the like, and is constituted by a server group which can provide information to generate a response to a user utterance.

On the other hand, Information Processing System Configuration Example 2 in FIG. 19(2) is a system example in which some of the functions of the information processing apparatus illustrated in FIG. 3 are configured within the information processing apparatus 410, which is the user terminal such as the smartphone or the PC owned by the user, and the agent device, and the other functions are configured to be executed in a data processing server 460 capable of communicating with the information processing apparatus.

For example, it is possible to configured such that only the speech input unit 101, the image input unit 104, the sensor 106 the speech output unit 123, and the image output unit 125 in the apparatus illustrated in FIG. 3 are provided on the information processing apparatus 410 side of the user terminal, and all the other functions are executed on the server side.

Note that various different settings are possible as a function division mode of functions on the user terminal side and functions the server side. Furthermore, a configuration in which one function is executed on both the sides is also possible.

11. Regarding Hardware Configuration Example of information Processing Apparatus Next, a hardware configuration example of the information processing apparatus will be described with reference to FIG. 20.

Figure 20:
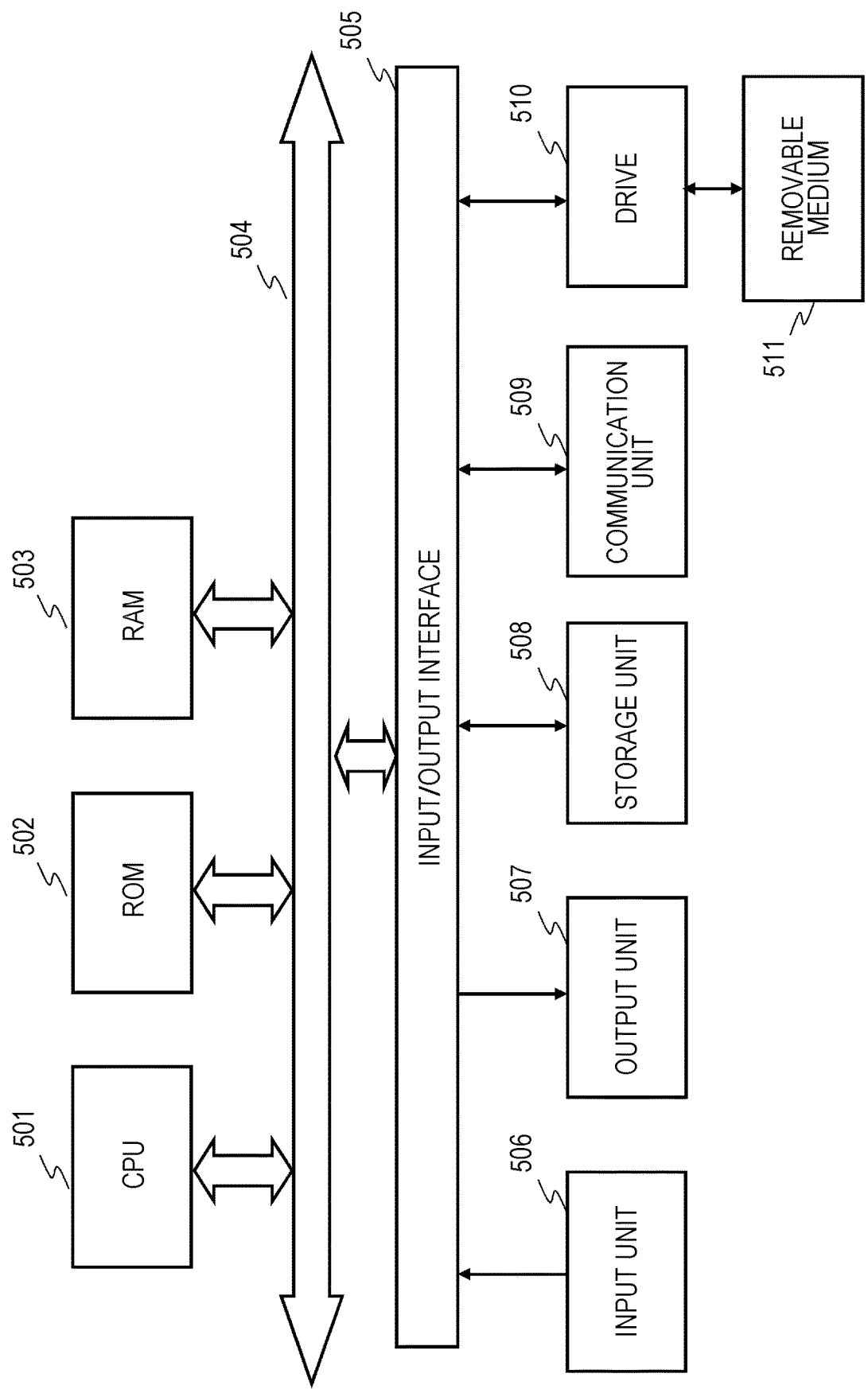
FIG. 20 is a diagram for describing an example of a hardware configuration of the information processing apparatus.

The hardware to be described with reference to FIG. 20 is an example of a hardware configuration of the information processing apparatus that has been described above with reference to FIG. 3, and is an example of a hardware configuration of an information processing apparatus constituting the data processing server 460 that has been described with reference to FIG. 19.

A central processing unit (CPU) 501 functions as a control unit or a data processing unit that executes various processes according to a program stored in a read only memory (ROM) 502 or a storage unit 508. For example, the processing according to the sequence described in the above-described embodiments is performed. The program to be executed by the CPU 501, data, and the like are stored in a random access memory (RAM) 503. The CPU 501, the ROM 502, and the RAM 503 are mutually connected via a bus 504.

The CPU 501 is connected to an input/output interface 505 via the bus 504 and an input unit 506 including various switches, a keyboard, a mouse, a microphone, and a sensor, and an output unit 507 including a display and a speaker are connected to the input/output interface 505. The CPU 501 executes various processes in response to an instruction input from the input unit 506, and outputs processing results to, for example, the output unit 507.

The storage unit 508 connected to the input/output interface 505 is configured using, for example, a hard disk, and stores a program to be executed by the CPU 501 and various types of data. A communication unit 509 functions as a transmission/reception unit of Wi-Fi communication, Bluetooth (registered trademark) (PT) communication, and other data communication via a network such as the Internet and a local area n work, and communicates with an external apparatus.

A drive 510 connected to the input/output interface 505 drives removable media 511 such as a magnetic disk, an optical disk, a magneto-optical disk, and a semiconductor memory such as a memory card, and executes data recording or reading.

12. Summary of Configuration of Present Disclosure

The embodiments of the present disclosure have been described in detail with reference to the specific embodiments. However, it is self-evident that those skilled in the art can make modifications and substitutions of the embodiments within a scope not departing from a gist of the present disclosure. In other words, the present invention has been disclosed in the form of exemplification, and should not be interpreted restrictively. In order to determine the gist of the present disclosure, the scope of claims should be taken into consideration.

Note that the technology disclosed in the present specification can have the following configurations.

(1) An information processing apparatus including
an utterance learning adaptive processing unit that analyzes an intent (intent) of a user utterance,
in which the utterance learning adaptive processing unit analyzes a plurality of user utterances input from a user, generates learning data in which entity information (entity) included in a user utterance with an unclear intent is associated with a correct intent, and stores the generated learning data in a storage unit.

(2) The information processing apparatus according to (1), in which,
after an input of a first user utterance with an unclear intent,
the utterance learning adaptive processing unit
executes an apparatus utterance for confirmation of an intent to receive an input of a second user utterance as a response utterance from the user to the apparatus utterance, and
generates learning data in which an intent acquired as an analysis result of the second user utterance is recorded in association with an utterance text and entity information of the first user utterance.

(3) The information processing apparatus according to (1) or (2), in which
after an input of a first user utterance with an unclear intent,
the utterance learning adaptive processing unit
executes an apparatus utterance for confirmation of an intent to receive an input of a second user utterance which is a response utterance from the user with respect to the apparatus utterance, and
generates learning data in which following (a) to (c) are associated with each other:
(a) an utterance text of the first user utterance;
(b) entity information commonly included in the first user utterance and the second user utterance; and
(c) a correct intent acquired as an analysis result of the second user utterance.

(4) The information processing apparatus according to any of (1) to (3), in which
the utterance learning adaptive processing unit records the learning data so as to include superordinate semantic concept information of the entity information.

(5) The information processing apparatus according to (4), in which
the superordinate semantic concept information is information indicating a type of the entity information.

(6) The information processing apparatus according to any one of (1) to (5), in which
the utterance learning adaptive processing unit records the learning data so as to include natural language processing information including superordinate semantic concept information of the entity information.

(7) The information processing apparatus according to any one of (1) to (6), in which
the utterance learning adaptive processing unit
acquires superordinate semantic concept information of entity information included in a new user utterance and extracts, from the storage unit, learning data in which superordinate semantic concept information similar to the acquired information has been recorded, in an intent analysis process of the new user utterance, and
estimates an intent recorded in the extracted learning data as an intent of the new user utterance in a case where matching of an utterance text other than the entity information included in the new user utterance with an utterance text recorded in the extracted learning data is confirmed.

(8) The information processing apparatus according to any of (1) to (7), in which
the utterance learning adaptive processing unit
acquires a correct intent to the basis of a re-utterance from the user in a case where the user inputs a user utterance pointing out an intent misinterpretation, and performs a process of correcting an erroneous intent information, which has been recorded in learning data that has been applied to intent estimation, to correct intent information.

(9) The information processing apparatus according to any one of (1) to (8), in which the learning data includes a plurality of pieces of learning data in units of states divided in accordance with a dialogue state (state) when a user utterance is executed.

(10) The information processing apparatus according to any one of (1) to (9), in which the utterance learning adaptive processing unit performs discard or stop of usage in accordance with a usage situation of the learning data stored in the storage unit.

(11) The information processing apparatus according to (10), in which for each piece of the learning data stored in the storage unit, the utterance learning adaptive processing unit calculates a learning data oblivion score f(t, c) on the basis of the following parameters:

a time elapsed since the user last uttered an utterance corresponding to learning data: t; and a repetition count of the utterance corresponding to learning data executed by the user: c, and compares a value of the calculated learning data oblivion score f(t, c) with a defined threshold to discard or stop using each pieces of the learning data.

(12) The information processing apparatus according to any one of (1) to (11), in which the learning data is learning data in which context information when a user utterance is executed has been recorded, and the utterance learning adaptive processing unit acquires context information when a new user utterance is input, extracts learning data in which context information similar to the acquired information has been recorded from the storage unit, and estimates an intent recorded in the extracted learning data as an intent of the new user utterance.

(13) The information processing apparatus according to any one of (1) to (12), in which the utterance learning adaptive processing unit analyzes a rephrasing utterance from the user executed in a case where the user utterance is an out-of-domain utterance, and does not execute a learning process based on the rephrasing utterance in a case where a degree of difference in a semantic concept between the user utterance and the rephrasing utterance is equal to or greater than a pre-defined threshold.

(14) The information processing apparatus according to any one of (1) to (13), in which in a case where it has been confirmed from a camera-captured image that in first user who has made a rephrasing utterance with respect to the out-of-domain utterance and a second user are present together, or in a case where it has been confirmed that the first user is a user who has been permitted for a learning utterance by the second user, the utterance learning adaptive processing unit executes an intent estimation process by causing learning data based on the rephrasing utterance from the first user to adapt to a new utterance from the second user.

(15) The information processing apparatus according to any one of (1) to (14), in which in a case where a request for rephrasing a user utterance is input as an instruction for association an utterance from a user with respect to an intent of a user utterance that has been previously executed, the utterance learning adaptive processing unit generates learning data in which an intent and entity information corresponding to the previously executed user utterance is associated with the user utterance after the rephrasing request.

(16) The information processing apparatus according to any one of (1) to (15), in which the utterance learning adaptive processing unit generates learning data in which a plurality of intents corresponding to a plurality of user utterances is associated with one user utterance.

(17) An information processing system including: a user terminal; and a data processing server, in which the user terminal comprises a speech input unit that inputs a user utterance, the data processing server comprises an utterance learning adaptive processing unit that analyzes an intent (intent) of the user utterance received from the user terminal, and the utterance learning adaptive processing unit analyzes a plurality of user utterances input from a user, generates learning data in which entity information (entity) included in a user utterance with an unclear intent is associated with a correct intent, and stores the generated learning data in a storage unit.

(18) An information processing method, which is executed in an information processing apparatus, the method including:

inputting a user utterance by a speech input unit; and executing an utterance learning adaptive process of analyzing an intent (intent) of the user utterance by an utterance learning adaptive processing unit, in which, in the utterance learning adaptive process, a process of analyzing a plurality of user utterances input from a user, and generating learning data in which entity information (entity) included in a user utterance with an unclear intent is associated with a correct intent, and storing the generated learning data in a storage unit is executed.

(19) An information processing method, which is executed in an information processing system including a user terminal and a data processing server, the method including:

executing a speech input process of inputting a user utterance by the user terminal; and executing an utterance learning adaptive process of analyzing an intent (intent) of the user utterance received from the user terminal by the data processing server, in which, in the utterance learning adaptive process, a process of analyzing a plurality of user utterances input from a user, and generating learning data in which entity information (entity) included in a user utterance with an unclear intent is associated with a correct intent, and storing the generated learning data in a storage unit is executed.

(20) A program, which causes an information processing apparatus to execute information processing, the program including:

a speech input step of causing a speech input unit to input a user utterance; and causing an utterance learning adaptive processing unit to execute an utterance learning adaptive process of analyzing an intent (intent) of the user utterance, in the utterance learning adaptive process, a process of analyzing a plurality of user utterances input from a user, and generating learning data in which entity information (entity) included in a user utterance with an unclear intent is associated with a correct intent, and storing the generated learning data in a storage unit is executed.

Further, the series of processing described in the specification can be executed by hardware, software, or a complex configuration of the both. When the processing is executed using software, it is possible to execute the processing by installing a program recording a processing sequence on a memory in a computer built into dedicated hardware or by installing a program in a general-purpose computer that can execute various processes. For example, the program can be recorded in a recording medium in advance. In addition to installing on a computer from the recording medium, it is possible to receive a program via a network, such as a local area network (LAN) and the Internet, and install the received program on a recording medium such as a built-in hard disk.

It can be installed on a recording medium such as a built-in hard disk.

Note that various processes described in the specification not only are executed in a time-series manner according to the description but also may be executed in parallel or separately depending on the processing performance of an apparatus that executes the process or need. Furthermore, the term "system" in the present specification refers to a logical set configuration of a plurality of apparatuses, and is not limited to a system in which apparatuses of the respective configurations are provided in the same housing.

INDUSTRIAL APPLICABILITY

As described above, according to the configuration of an embodiment of the present disclosure, an apparatus and method are realized that enable highly accurate intent estimation of user utterances.

Specifically, for example, an utterance learning adaptive processing unit analyzes a plurality of user utterances input from a user, generates learning data in which entity information included in a user utterance with an unclear intent is associated with a correct intent, and stores the generated learning data in a storage unit. The utterance learning adaptive processing unit generates learning data in which an intent, acquired from a response utterance from the user to an apparatus utterance after input of a first user utterance with an unclear intent, is recorded in association with entity information included in the first user utterance. The learning data is recorded to include superordinate semantic concept information of the entity information. At the time of estimating an intent for a new user utterance, learning data with similar superordinate semantic concept information is used.

With this configuration, the apparatus and the method, which enable the highly accurate estimation of an intent of a user utterance, are realized.

REFERENCE SIGNS LIST

10 Information processing apparatus
11 Camera
12 Microphone
13 Display unit
14 Speaker
20 Server
30 External device
100 Information processing apparatus
101 Speech input unit
102 Speech recognition unit
103 Utterance semantic analysis unit
104 Image input unit
105 Image recognition unit
106 Sensor
107 Sensor information analysis unit
108 Utterance learning adaptive processing unit
111 Knowledge dictionary data storage unit
112 Utterance learning data storage unit
121 Response generation unit
122 Speech synthesis unit
123 Speech output unit
124 Display image generation unit
125 Image output unit
410 Information processing apparatus
420 Application execution server
460 Data processing server
501 CPU
502 ROM
503 RAM
504 Bus
505 Input/output interface
506 Input unit
507 Output unit
508 Storage unit
509 Communication unit
510 Drive
511 Removable medium

The invention claimed is:

1. An information processing apparatus comprising
an utterance learning adaptive processing unit configured to
analyze an intent of a user utterance,
analyze a plurality of user utterances input from a user,
generate learning data in which entity information included in a user utterance has an unclear intent,
store the generated learning data in a storage unit,
acquire a correct intent on a basis of a re-utterance from the user in a case where the user inputs a user utterance pointing out an intent misinterpretation, and
perform a process of correcting an erroneous intent information, which has been recorded in learning data that has been applied to intent estimation, to correct intent information,
wherein the utterance learning adaptive processing unit and the storage unit are each implemented via at least one processor.

2. The information processing apparatus according to claim 1, wherein after an input of a first user utterance with an unclear intent, the utterance learning adaptive processing unit is further configured to
execute an apparatus utterance for confirmation of an intent to receive an input of a second user utterance as a response utterance from the user to the apparatus utterance, and
generate learning data in which an intent acquired as an analysis result of the second user utterance is recorded in association with an utterance text and entity information of the first user utterance.

3. The information processing apparatus according to claim 1, wherein after an input of a first user utterance with an unclear intent, the utterance learning adaptive processing unit is further configured to
execute an apparatus utterance for confirmation of an intent to receive an input of a second user utterance which is a response utterance from the user with respect to the apparatus utterance, and generate learning data in which following (a) to (c) are associated with each other:
- (a) an utterance text of the first user utterance;
- (b) entity information commonly included in the first user utterance and the second user utterance; and
- (c) a correct intent acquired as an analysis result of the second user utterance.

4. The information processing apparatus according to claim 1, wherein the utterance learning adaptive processing unit is further configured to record the learning data so as to include superordinate semantic concept information of the entity information.

5. The information processing apparatus according to claim 4, wherein the superordinate semantic concept information includes information indicating a type of the entity information.

6. The information processing apparatus according to claim 1, wherein the utterance learning adaptive processing unit is further configured to record the learning data so as to include natural language processing information including superordinate semantic concept information of the entity information.

7. The information processing apparatus according to claim 1, wherein the utterance learning adaptive processing unit is further configured to
acquire superordinate semantic concept information of entity information included in a new user utterance and extracts, from the storage unit, learning data in which superordinate semantic concept information similar to the acquired information has been recorded, in an intent analysis process of the new user utterance, and
estimate an intent recorded in the extracted learning data as an intent of the new user utterance in a case where matching of an utterance text other than the entity information included in the new user utterance with an utterance text recorded in the extracted learning data is confirmed.

8. The information processing apparatus according to claim 1, wherein the learning data includes a plurality of pieces of learning data in units of states divided in accordance with a dialogue state (state) when a user utterance is executed.

9. The information processing apparatus according to claim 1, wherein the utterance learning adaptive processing unit is further configured to perform discard or stop of usage in accordance with a usage situation of the learning data stored in the storage unit.

10. The information processing apparatus according to claim 9, wherein for each piece of the learning data stored in the storage unit, the utterance learning adaptive processing unit is further configured to
calculate a learning data oblivion score f(t, c) on a basis of the following parameters:
a time elapsed since the user last uttered an utterance corresponding to learning data: t; and
a repetition count of the utterance corresponding to learning data executed by the user: c, and
compare a value of the calculated learning data oblivion score f(t, c) with a defined threshold to discard or stop using each pieces of the learning data.

11. The information processing apparatus according to claim 1, wherein the learning data includes learning data in which context information when a user utterance is executed has been recorded, and
the utterance learning adaptive processing unit is further configured to
acquire context information when a new user utterance is input,
extract learning data in which context information similar to the acquired information has been recorded from the storage unit, and
estimate an intent recorded in the extracted learning data as an intent of the new user utterance.

12. The information processing apparatus according to claim 1, wherein the utterance learning adaptive processing unit is further configured to
analyze a rephrasing utterance from the user executed in a case where the user utterance is an out-of-domain utterance, and
not execute a learning process based on the rephrasing utterance in a case where a degree of difference in a semantic concept between the user utterance and the rephrasing utterance is equal to or greater than a pre-defined threshold.

13. The information processing apparatus according to claim 1, wherein in a case where it has been confirmed from a camera-captured image that a first user who has made a rephrasing utterance with respect to an out-of-domain utterance and a second user are present together, and in a case where it has been confirmed that the first user is a user who has been permitted for a learning utterance by the second user, the utterance learning adaptive processing unit is further configured to execute an intent estimation process by causing learning data based on the rephrasing utterance from the first user to adapt to a new utterance from the second user.

14. The information processing apparatus according to claim 1, wherein in a case where a request for rephrasing a first user utterance is input as an instruction for associating a second user utterance from a user with respect to an intent of the first user utterance that has been previously executed, the utterance learning adaptive processing unit is further configured to generate learning data in which the intent and the entity information corresponding to the first user utterance is associated with the second user utterance after the rephrasing request.

15. The information processing apparatus according to claim 1, wherein the utterance learning adaptive processing unit is further configured to generate learning data in which a plurality of intents corresponding to a plurality of user utterances is associated with one user utterance.

16. An information processing system comprising:
a user terminal; and
a data processing server,
wherein the user terminal comprises a speech input unit that inputs a user utterance,
the data processing server comprises an utterance learning adaptive processing unit configured to
analyze an intent of the user utterance received from the user terminal,
analyze a plurality of user utterances input from a user,
generate learning data in which entity information included in a user utterance has an unclear intent,
store the generated learning data in a storage unit,
acquire a correct intent on a basis of a re-utterance from the user in a case where the user inputs a user utterance pointing out an intent misinterpretation, and
perform a process of correcting an erroneous intent information, which has been recorded in learning data that has been applied to intent estimation, to correct intent information, and the speech input unit, the utterance learning adaptive processing unit, and the storage unit are each implemented via at least one processor.

17. An information processing method, which is executed in an information processing apparatus, the method comprising:
   inputting a user utterance; and
   executing an utterance learning adaptive process of analyzing an intent of the user utterance,
   wherein the executing of the utterance learning adaptive process includes analyzing a plurality of user utterances input from a user, generating learning data in which entity information included in a user utterance has an unclear intent, storing the generated learning data, acquiring a correct intent on a basis of a re-utterance from the user in a case where the user inputs a user utterance pointing out an intent misinterpretation, and performing a process of correcting an erroneous intent information, which has been recorded in learning data that has been applied to intent estimation, to correct intent information.

18. An information processing method, which is executed in an information processing system including a user terminal and a data processing server, the method comprising:
   executing a speech input process of inputting a user utterance by the user terminal; and
   executing an utterance learning adaptive process of analyzing an intent of the user utterance received from the user terminal by the data processing server,
   wherein the executing of the utterance learning adaptive process includes analyzing a plurality of user utterances input from a user, generating learning data in which entity information included in a user utterance has an unclear intent, storing the generated learning data, acquiring a correct intent on a basis of a re-utterance from the user in a case where the user inputs a user utterance pointing out an intent misinterpretation, and performing a process of correcting an erroneous intent information, which has been recorded in learning data that has been applied to intent estimation, to correct intent information.

19. A non-transitory computer-readable medium having embodied thereon a program, which when executed by a computer causes the computer to execute an information processing method, the method comprising:
   executing a speech input process of inputting a user utterance; and
   executing an utterance learning adaptive process of analyzing an intent of the user utterance,
   wherein the executing of the utterance learning adaptive process includes analyzing a plurality of user utterances input from a user, generating learning data in which entity information included in a user utterance has an unclear intent, storing the generated learning data, acquiring a correct intent on a basis of a re-utterance from the user in a case where the user inputs a user utterance pointing out an intent misinterpretation, and performing a process of correcting an erroneous intent information, which has been recorded in learning data that has been applied to intent estimation, to correct intent information.

* * * * *